(12) United States Patent
Kim

(10) Patent No.: US 10,274,791 B2
(45) Date of Patent: Apr. 30, 2019

(54) LIQUID CRYSTAL DISPLAY APPARATUS

(71) Applicant: LG DISPLAY CO., LTD., Seoul (KR)

(72) Inventor: Tae-Sang Kim, Cheonan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/064,065

(22) Filed: Mar. 8, 2016

(65) Prior Publication Data

US 2016/0266450 A1 Sep. 15, 2016

(30) Foreign Application Priority Data

Mar. 9, 2015 (KR) .................. 10-2015-0032646

(51) Int. Cl.
*G02F 1/136* (2006.01)
*G02F 1/1333* (2006.01)
*G02F 1/1343* (2006.01)
*G02F 1/1335* (2006.01)
*G02F 1/1362* (2006.01)

(52) U.S. Cl.
CPC .. *G02F 1/134309* (2013.01); *G02F 1/133512* (2013.01); *G02F 1/133514* (2013.01); *G02F 1/133553* (2013.01); *G02F 1/134363* (2013.01); *G02F 1/136286* (2013.01); *G02F 1/13338* (2013.01); *G02F 2001/13606* (2013.01); *G02F 2001/13629* (2013.01); *G02F 2001/133357* (2013.01); *G02F 2001/134318* (2013.01); *G02F 2001/134372* (2013.01)

(58) Field of Classification Search
CPC ......... G02F 1/134309; G02F 1/133512; G02F 1/133553; G02F 1/134363; G02F 1/136286; G02F 1/133514; G02F 2001/13606; G02F 2001/133357; G02F 2001/13629; G02F 1/13338; G02F 2001/134318; G02F 2001/134372
See application file for complete search history.

(56) References Cited

U.S. PATENT DOCUMENTS

| 2002/0159016 | A1* | 10/2002 | Nishida | ............ G02F 1/134363 |
| | | | | 349/141 |
| 2003/0107037 | A1* | 6/2003 | Youn | ................ G02F 1/134363 |
| | | | | 257/59 |
| 2003/0184699 | A1* | 10/2003 | Matsumoto | ....... G02F 1/134363 |
| | | | | 349/141 |
| 2003/0218664 | A1* | 11/2003 | Sakamoto | ......... G02F 1/133555 |
| | | | | 347/114 |

(Continued)

*Primary Examiner* — Michael H Caley
*Assistant Examiner* — Mariam Qureshi
(74) *Attorney, Agent, or Firm* — Dentons US LLP

(57) ABSTRACT

Provided is a liquid crystal display apparatus. The liquid crystal display apparatus comprises a plurality of common electrode lines on a first substrate, a first planarization layer on the plurality of common electrode lines, a plurality of data lines on the first planarization layer, a second planarization layer on the plurality of data lines, and a plurality of divided common electrodes on the second planarization layer, wherein an opening portion is between the plurality of divided common electrodes, wherein the common electrode lines and the data lines overlap each other at the opening portion, and wherein a width of the common electrode lines is larger than a width of the data lines for reducing a degree of color wash-out phenomenon of neighboring sub-pixels adjacent to the opening portion.

15 Claims, 8 Drawing Sheets

(56) References Cited

U.S. PATENT DOCUMENTS

| | | | |
|---|---|---|---|
| 2007/0013832 A1* | 1/2007 | Nishida | G02F 1/133514 349/107 |
| 2009/0237578 A1* | 9/2009 | Naka | G02F 1/133555 349/33 |
| 2012/0127414 A1* | 5/2012 | Shin | G06F 3/0412 349/139 |
| 2013/0257794 A1 | 10/2013 | Lee et al. | |
| 2013/0271683 A1* | 10/2013 | Jang | G02F 1/134363 349/42 |
| 2014/0131714 A1* | 5/2014 | Bai | G02F 1/1368 257/59 |
| 2015/0015838 A1* | 1/2015 | Chang | G02F 1/13394 349/110 |
| 2015/0301381 A1* | 10/2015 | Okita | G02F 1/13338 349/12 |
| 2016/0357308 A1* | 12/2016 | Li | G06F 3/044 |

* cited by examiner

LIQUID CRYSTAL DISPLAY APPARATUS

CROSS REFERENCE TO RELATED APPLICATIONS

This application claims the benefit of the Korean Patent Application No. 10-2015-0032646 filed on Mar. 9, 2015, which is hereby incorporated by reference for all purposes as if fully set forth herein.

BACKGROUND

Technical Field

The present disclosure relates to a liquid crystal display apparatus. More particularly, the present disclosure relates to a common electrode line of a liquid crystal display apparatus capable of reducing color wash-out problem.

Description on the Related Art

As the information age has heightened, display apparatuses for visualizing digital data signals have been rapidly developed. In this regard, research has been continuously conducted on various flat display apparatuses to develop thin and light weight display apparatuses. Typical examples of such flat display apparatuses include a plasma display panel (PDP), a field emission display (FED), an electro-wetting display (EWD) and a liquid crystal display (LCD).

A liquid crystal display apparatus can be made in a light weight and thin form. In addition, the liquid crystal display apparatus is advantageous in terms of power consumption, color gamut, resolution, and viewing angle. For these reasons, the liquid crystal display apparatus has been applied to various electronic devices.

The liquid crystal display apparatus is configured to have a pixel electrode and a common electrode for controlling the liquid crystal. However, the common electrode is a transparent conductive electrode having a high electrical resistance in general. Thus, there have been difficulties in controlling the voltage supplied to the common electrode.

SUMMARY

Based upon such problem recognition, the inventor of the present disclosure has been conducting research and development for realizing various functions of the liquid crystal display apparatus, splitting a common electrode into a plurality of common electrodes and controlling each of the plurality of the common electrodes. The liquid crystal display apparatus having a structure such that a common electrode is divided into a plurality of regions and a plurality of common electrode lines are configured to control the divided common electrodes, is more complex and harder to manufacture than the conventional liquid crystal display apparatus.

According to the shape of the divided common electrodes and the layout of the common electrode lines, the performance of the realized various functions can vary and the picture quality can be degraded. Specifically, a light leakage phenomenon, and/or a color wash-out (color bleaching, color mixing) phenomenon can occur, thus, the picture quality of the liquid crystal display apparatus can be degraded.

Accordingly, an aspect of the present disclosure is to provide a novel liquid crystal display apparatus for reducing the degree of the light leakage phenomenon and/or the color wash-out phenomenon which result in improving the picture quality.

According to one aspect, a novel liquid crystal display apparatus is provided having a novel shape of the divided common electrodes and a layout of plurality of the common electrode lines capable of improving performance of the various functions. Such functions are realized for the liquid crystal display apparatus and for reducing the degree of the light leakage phenomenon and/or the color wash-out phenomenon which result in improving the picture quality.

Another aspect of the present disclosure is to provide a liquid crystal display apparatus having a structure for common electrode line capable of increasing ambient contrast ratio (ACR) in which the reflectance of the visible wavelengths of the upper surface of the common electrode line and the reflectance of the visible wavelengths of the rear surface of the common electrode line are different.

Yet another aspect of the present disclosure is to provide a liquid crystal display apparatus having a novel structure for common electrode line capable of reducing parasitic capacitance in order to improve performance of the various functions realized for the liquid crystal display apparatus.

Yet another aspect of the present disclosure is to provide a liquid crystal display apparatus having an auxiliary common electrode capable of generating an additional electric field for compensating an opening portion between the plurality of common electrodes, thereby further reducing the degree of the light leakage phenomenon and/or the color wash-out phenomenon.

It should be noted that aspects of the present disclosure are not limited to the above-described aspects, and other aspects of the present disclosure will be apparent to those skilled in the art from the following descriptions.

According to an aspect of the present disclosure, there is provided a liquid crystal display apparatus comprising: a plurality of common electrode lines on a first substrate; a first planarization layer on the plurality of common electrode lines; a plurality of data lines on the first planarization layer; a second planarization layer on the plurality of data lines; and a plurality of divided common electrodes on the second planarization layer, wherein an opening portion is between the plurality of divided common electrodes, wherein the plurality of common electrode lines and the plurality of data lines overlap each other at the opening portion, and wherein a width of each of the plurality of common electrode lines is larger than a width of each of the plurality of data lines for reducing a degree of color wash-out phenomenon of neighboring sub-pixels adjacent to the opening portion.

The width of the common electrode line may be larger than a width of the opening portion.

The width of the opening portion may be equal to or more than 3 μm.

A portion of the plurality of common electrode lines may be overlap a portion of each of the divided common electrodes adjacent to the opening portion.

The width of a cross section of the common electrode lines may be at least 1 μm larger than the width of the opening portion.

The liquid crystal display apparatus may further comprise a second substrate having a color filter and a black matrix, wherein the black matrix may be overlap the common electrode lines at the opening portion, and wherein a width of the black matrix may be larger than the width of the common electrode lines.

The width of the common electrode line may be 60% to 90% of the width of the black matrix.

The first planarization layer may be made of an inorganic material and the second planarization layer may be made of an organic material.

The first planarization layer may be made of a silicon nitride (SiNx) or a silicon oxide (SiOx), wherein the thickness of the first planarization may be at least 0.8 μm. The second planarization layer may be made of a photo-acrylic or a polyimide, wherein the thickness of the second planarization layer may be at least 1 μm.

The liquid crystal display apparatus may further comprise a passivation layer positioned on the plurality of divided common electrodes; and a pixel electrode and an auxiliary common electrode positioned on the passivation layer, wherein the auxiliary common electrode may be positioned at the opening portion.

The auxiliary common electrode may be configured to be electrically connected to a neighboring divided common electrode among the plurality of the divided common electrodes.

A width of the auxiliary common electrode may be smaller than the width of the opening portion.

The width of the auxiliary common electrode may be between 3 μm and 4 μm.

The width of the opening portion may be between 5.5 μm and 6.5 μm.

The divided common electrode may be configured for self-capacitance sensing.

The plurality of common electrode lines may be extended along with the plurality of the data lines.

The plurality of common electrode lines and the plurality of data lines may be connected to a data driver are positioned at a periphery area.

The plurality of common electrode lines may include at least two stacked metallic layers, wherein a reflectance of visible wavelengths of each metallic layer may be different from each other.

The reflectance of visible wavelengths of a bottommost metallic layer of the common electrode lines may be higher than the reflectance of visible wavelengths of an uppermost metallic layer of the common electrode lines.

The uppermost metallic layer of the common electrode lines may include at least one element among carbon, nitrogen and oxygen.

The uppermost metallic layer of the common electrode lines may be made of copper nitrogen (CuNx), wherein the thickness of the uppermost metallic layer of the common electrode lines may be at least 250 Å.

The width of the bottommost metallic layer of the common electrode line may be larger than the width of the uppermost metallic layer of the common electrode line.

The width of the uppermost metallic layer of the common electrode line may be the same as the width of the data line.

According to another aspect of the present disclosure, there is provided a liquid crystal display apparatus comprising: a liquid crystal panel configured to include a color filter substrate, an array substrate and a liquid crystal layer interposed between the color filter substrate and the array substrate; a black matrix configured to separate sub-pixels of the color filter substrate; and a color wash-out reducing layer on the array substrate and configured to reduce color wash-out phenomenon of the sub-pixels which are separated by the black matrix.

The liquid crystal display apparatus may further comprise a plurality of divided common electrodes on the array substrate, wherein an opening portion may be configured between a plurality of divided common electrodes, wherein the color wash-out reducing layer may be configured to be overlapped at the opening portion.

The color wash-out reducing layer may be configured to control the plurality of divided common electrodes.

The color wash-out reducing layer and the divided common electrodes may be separated by an inorganic planarization layer having a thickness of at least 0.8 μm, resulting in reduced parasitic capacitance when compared to a conventional liquid crystal display apparatus with said color wash-out reducing layer.

The reflectance of visible wavelengths of one side of the color wash-out reducing layer facing the liquid crystal layer may be lower than the reflectance of visible wavelengths of the other side of the color wash-out reducing layer facing to the liquid crystal layer.

The cross-section of the color wash-out layer may be formed in a tapered stepwise or stair-like shape.

According to yet another aspect of the present disclosure, there is provided a liquid crystal display apparatus comprising: a plurality of common electrode lines, a plurality of data lines, a plurality of divided common electrodes and a data driver on a first substrate; wherein the divided common electrodes are spaced apart from each other, thereby forming an opening portion therebetween, wherein the common electrode line and the data line are in the opening portion and are overlapped with each other, and wherein a width of the common electrode line is larger than a width of the data line.

An arrangement of the plurality of the common electrode lines, the plurality of divided common electrodes and the data driver may be configured to provide at least one added function among self-capacitance sensing function, power saving function, and over driving function.

Particulars of various exemplary embodiments of the present disclosure are included in the detailed description and the accompanying drawings.

According to the present disclosure, a structure of the common electrode line and a shape of the divided common electrode are provided, so that the performance of the various functions realized for the liquid crystal display apparatus is improved and the degree of the light leakage phenomenon or the degree of the color wash-out phenomenon can be reduced. Therefore picture quality of the liquid crystal display apparatus can be improved.

In addition, according to the present disclosure, a structure for common electrode line, in which the reflectance of the visible wavelengths of the upper surface of the common electrode line and the reflectance of the visible wavelengths of the rear surface of the common electrode line are different, is provided, so that the ambient contrast ratio can be improved.

Further, according to the present disclosure, a structure for the common electrode line capable of reducing parasitic capacitance is provided, so that the performance of the various functions can be improved.

Furthermore, according to the present disclosure, an auxiliary common electrode capable of generating additional electric field for compensating the opening portion is provided, so that the degree of the light leakage phenomenon or the degree of the color wash-out phenomenon can be further reduced It should be noted that the effects of the present disclosure are not limited to those described above and other effects of the present disclosure will be apparent to those skill in the art from the following descriptions.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE INVENTION

Figure 1:
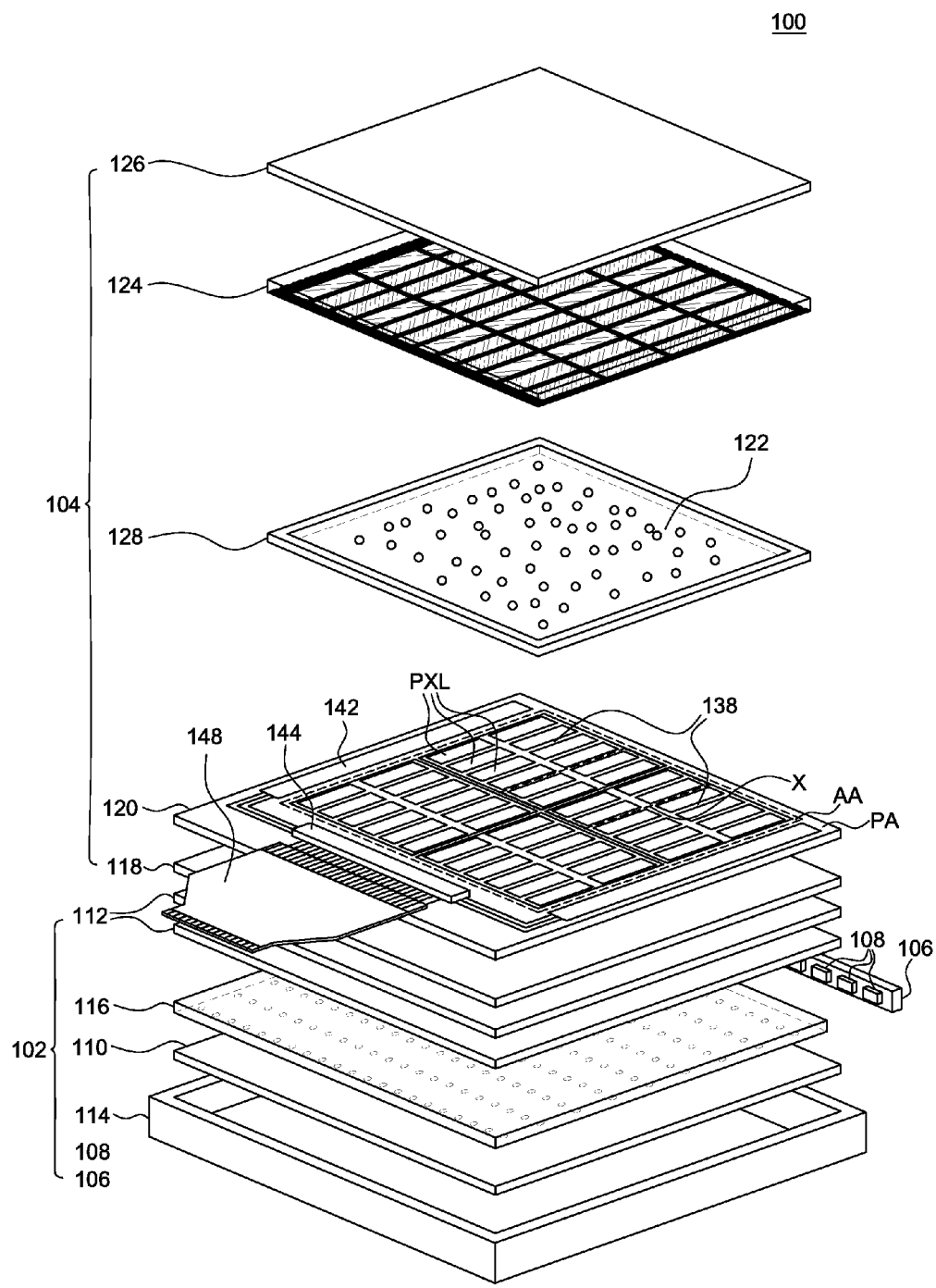
FIG. 1 is a schematic exploded perspective view of a liquid crystal display apparatus according to an exemplary embodiment of the present disclosure.

Advantages and features of the present disclosure and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the invention, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including", "having", "comprising" and "consist of" used herein are generally intended to allow other components to be added unless the terms are used with the term "only". Any references to singular may include plural unless expressly stated otherwise.

Components are interpreted to include an ordinary error range or an ordinary tolerance range even if not expressly stated.

When the position relation between two parts is described using the terms such as "on", "above", "below", and "next", on or more parts may positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since the size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways as can be fully understood by a person having ordinary skill in the art, and the embodiments can be carried out independently of or in association with each other.

Various exemplary embodiments of the present disclosure will be described in detail with reference to the accompanying drawings.

FIG. 1 is a schematic exploded perspective view of a liquid crystal display apparatus according to an exemplary embodiment of the present disclosure. A liquid crystal display apparatus 100 according to an exemplary embodiment of the present disclosure comprises a light source unit 102 and a liquid crystal display panel 104. One side of the liquid crystal display panel 104 is configured to face an emissive side of the light source unit 102.

Referring to FIG. 1, the light source unit 102 is disclosed in detail. The light source unit 102 includes at least a light source circuit unit 106, light sources 108, a reflector 110, an optical sheet 112 and a support unit 114.

Referring to FIG. 1, according to an embodiment of the present disclosure, the light source unit 102, which may be an edge-type, is illustrated. According to an embodiment of the present disclosure, an edge-type light source unit 102 further includes a light guide plate 116. Accordingly, the light sources 108 of the edge-type light source unit 102 are positioned at least on one side of the light guide plate 116. The edge type light source unit 102 has an advantage of reducing the number of light sources 108 when the liquid crystal display apparatus 100 is enlarged. In addition, the edge type light source unit 102 has an advantage of reducing the thickness of the liquid crystal display apparatus 100 by reducing the thickness of the light guide plate 116 when the liquid crystal display apparatus 100 is undersized.

The light source circuit unit 106 may provide an electrical signal to the light sources 108. In the case of the edge-type light source unit, the light source circuit unit 106 may be formed of a bar shape. The light sources 108 are spaced by a specific distance from each other and are arranged in a row and are mounted on the light source circuit unit 106. The light source circuit unit 106 can be configured with components such as a printed circuit board, electrical wires or connectors. But the present disclosure is not limited thereto.

The light sources 108 may be selected from various types of light sources. For example, the light sources 108 may be a light emitting diode (LED) or a fluorescent lamp. In such case, the light sources 108 is configured to output white light spectrum. For example, the light sources 108 may be configured to output yellow-green light and blue light spectrum simultaneously, or red light, green light and blue light spectrum simultaneously. But the present disclosure is not limited thereto.

In some embodiments, the light sources 108 may further include a fluorescent material, a quantum dot or a nano-crystal. In such case, the light sources 108 may output blue light spectrum. According to the configuration as described above, the outputted blue light spectrum from the light sources 108 may be converted into a red light spectrum and a green light spectrum by the quantum dot or the nano-crystal. Accordingly, the light source unit 102 has an advantage of outputting white light spectrum with wider color gamut.

A light ray injection side of the light guide plate 116 is configured to face the light output direction of the light sources 108 correspondingly. The light guide plate 116 may be formed of a material and configured to have optical transparency in terms of visible wavelengths. The light guide plate 116 may be formed of glass or acrylic resin. But the present disclosure is not limited thereto.

In case of the light guide plate 116 is made of glass, the coefficient of thermal expansion of the light guide plate 116 is comparatively small, and thus, it can be manufactured in thin forms. Accordingly, the light guide plate 116 has an advantage of minimizing the thickness of the light guide plate 116. Consequently, the support unit 114, which supports the light guide plate 116, can be designed with minimal design margin or tolerance in view of thermal expansion of the light guide plate 116, and thus, the width of the bezel can be minimized.

In case the light guide plate 116 is made of poly methyl methacrylate (PMMA), the light guide plate 116 has higher transparency in terms of visible wavelengths than glass, and thus, optical efficiency of the light source unit 102 can be increased.

A plurality of the light scattering patterns, which are formed at the rear surface of the light guide plate 116 and are capable of scattering total internal reflection of the injected light within the light guide plate 116, are output from the light source. The light scattering patterns may be a plurality of dot patterns, and can be configured in various patterns. Density of the dispersed light scattering patterns can be differently arranged for different areas of the light guide plate 116 with respect to the position of light sources 108. For example, the density of the dispersed light scattering patterns may be increased as the scattering patters become more distant from the light scattering patterns. According to the configuration as described above, the light guide plate 116 has an advantage of improving uniformity of the light distribution in which the liquid crystal display panel 104 is output by the light scattering patterns.

In some embodiments, at least one surface of the light guide plate 116 may further include a fluorescent material, a quantum dot or a nano-crystal. In such case, the light sources 108 may output blue light spectrum. According to the configuration as described above, the output blue light spectrum from the light sources 108 may be converted into a red light spectrum and a green light spectrum by the quantum dot or the nano-crystal. Accordingly, the light source unit 102 has an advantage of outputting white light spectrum with wider color gamut.

The reflector 110 is positioned under the rear surface of the light guide plate 116. The reflector 110 reflects a portion of light, illuminated from the light sources 108, toward the reflector 110 such that the portion of the light is redirected to the liquid crystal display panel 104. Thus, the reflector 110 is capable of increasing brightness of the liquid crystal display apparatus 100. The reflectance of the reflector 110 in terms of the visible wavelengths can be configured to be above 90%. The reflector 110 is configured to have mirror-like reflection characteristic or scattering-like reflection characteristic.

The optical sheet 112 positioned on upper side of the light source unit 102 is configured to improve uniformity and brightness of the light entering from the light source 102 to the liquid crystal display panel 104. In the case of the edge-type light source unit, the optical sheet 112 may be positioned between a light guide plate 116 and a liquid crystal display panel 104.

The optical sheet 112 may be configured as a diffuser sheet which improves uniformity of the brightness of the liquid crystal display apparatus 100, a prism sheet which improves brightness of the liquid crystal display apparatus 100, or a multi-functional sheet in which the diffuser sheet and the prism sheet are integrated. But the present disclosure is not limited thereto, and the optical sheet 112 may be configured as at least one optical sheet.

The support unit 114 is configured to support the light source circuit unit 106, the light sources 108, the reflector 110 and the optical sheet 112. The support unit 114 may be made of a plastic. The support unit 114 is configured to surround the sides of the light sources 108 and the light guide plate 116. But the present disclosure is not limited thereto.

In some embodiments, the support unit 114 of the liquid crystal display apparatus 100 may comprise a glass fiber therein. Consequently, a degree of thermal expansion of the support unit 114 of the liquid crystal display apparatus 100 can be reduced.

In some embodiments, the support unit 114 of the liquid crystal display apparatus 100 may be configured to support the light source circuit unit 106, the light sources 108, the reflector 110 or the optical sheet 112 by using only an adhesive tape and/or a double sided adhesive tape. Consequently, the support unit 114 of the liquid crystal display apparatus 100 can be made in a light weight and thin form.

The edge-type light source unit 102 has an advantage of using a relatively small number of light sources 108 for the liquid crystal display apparatus 100 of relatively large size. In addition, the edge-type light source unit 102 has an advantage of reducing thickness of the light guide plate 116, thus, the liquid crystal display apparatus 100 can be manufactured in thin forms.

In some embodiments, the emission direction the light source unit may be realized in a direct-type. The number of light sources of the direct-type light source unit is generally higher than the number of light sources of the edge-type light source, as the light source is configured to emit light to the liquid crystal panel directly. Furthermore, the direct-type light source unit has an advantage of achieving high contrast ratio due to a local dimming control scheme where each of the light sources can be individually controlled by a control circuit. Moreover, the direct-type light source unit is capable of providing high density of light flux directly to the liquid crystal panel, thereby realizing a high dynamic range (HDR) image that is brighter and more dynamic than a non-HDR image.

In some embodiments, the light source unit 102 of the liquid crystal display apparatus 100 may be unnecessary. In such case, the liquid crystal display apparatus 100 is configured to use ambient light incident to the liquid crystal panel. The ambient light may be sunlight or external lighting. In particular, when the external lighting is used, the liquid crystal display apparatus 100 may be realized as a see-through display device, which can allow the background to be seen through the liquid crystal display apparatus 100.

Referring to FIG. 1, the liquid crystal display panel 104 is briefly disclosed. The liquid crystal display panel 104 is a passive device which is a non-emissive type. Accordingly, the light source unit 102 is configured to confront one side of the liquid crystal display panel 104 for supplying light to the liquid crystal display panel 104. Thus, the liquid crystal display panel 104 is configured to display an image with the supplied light from the light source unit 102.

The liquid crystal display panel 104 includes at least a first polarizer film 118, a first substrate 120, a liquid crystal layer 122, a second substrate 124, a second polarizer film 126 and a sealing material 128. The liquid crystal display panel 104 may be divided into an active area AA and a periphery area PA. The active area AA includes at least a plurality of sub-pixels PXL configured to display an image. A sub-pixel PXL includes a red sub-pixel PXL, a green sub-pixel PXL and a blue sub-pixel PXL. The periphery area PA is configured to surround the active area AA. Various circuits may be positioned at the periphery area PA to drive each of the plurality of sub-pixels PXL of the active area AA. In the present disclosure, the sub-pixel PXL is the minimal unit of the active area AA of the liquid crystal display apparatus 100 for displaying an image. The sub-pixel PXL may include various elements for displaying an image.

In some embodiments, the sub-pixel PXL of the liquid crystal display panel 104 may be configured as a white sub-pixel, a red sub-pixel PXL, a green sub-pixel PXL, and a blue sub-pixel PXL. In some embodiments, the sub-pixel PXL of the liquid crystal display panel 104 may be configured as a red sub-pixel PXL, a green sub-pixel PXL, a blue sub-pixel PXL and a green sub-pixel PXL. In some embodiments, the sub-pixel PXL of the liquid crystal display panel 104 may be configured as a red sub-pixel PXL, a green sub-pixel PXL, a blue sub-pixel PXL and a yellow sub-pixel PXL.

The transmittance (%) of each sub-pixel is configured to be adjusted according to the data signal inputted from an external system. An image is displayed on the active area AA of the liquid crystal display panel 104 according to the adjusted transmittance (%) of each of the plurality of sub-pixels, thereby adjusting the brightness of the light incident on the liquid crystal display panel 104.

The first polarizer film 118 is positioned on the rear side of the first substrate 120 and is configured to polarize the light incident on the first substrate 120. The first polarizer film 118 is configured to cover the active area AA and at least a portion of the periphery area PA of liquid crystal display panel 104. The first polarizer film 118 may be configured to be adhered on the rear side of the first substrate 120 by an adhesive layer. In such case, the adhesive layer may be a pressure sensitive adhesive (PSA). But the present disclosure is not limited thereto.

The second polarizer film 126 is positioned on the upper side of the second substrate 124 and is configured to polarize the light passed through the second substrate 124. The second polarizer film 126 is configured to cover the active area AA and at least a portion of the periphery area PA of the liquid crystal display panel 104. The second polarizer film 126 may be configured to be adhered on the upper side of the second substrate 124 by an adhesive layer. In such case, the adhesive layer may be a pressure sensitive adhesive (PSA). But the present disclosure is not limited thereto.

In some embodiments, the first polarizer film 118 and/or the second polarizer film 126 may be realized not only as a film but in various different forms. For example, any one among the two polarizers on any one among the two substrates may be substituted with an iodine layer coated on the substrate and configured to polarize the light incident on the substrate.

The first substrate 120 may control the liquid crystal layer 122 and is configured to rotate the axis of the polarized light, which passed through the first polarizer 118 incident on the first substrate 120. The degree of the rotated axis of the polarized light is in accordance with the data signal inputted to each of the sub-pixels PXL. Elements, which generate an electric field at each sub pixels PXL that is capable of controlling the liquid crystal layer 122, are positioned on the first substrate 120 for controlling the axis of the polarized light. The strength of the electric field is in accordance with the data signal. In the present disclosure, the term "array substrate" may be defined as the substrate including elements that are capable of controlling the liquid crystal layer 122 and is positioned thereon.

The detailed description regarding the first substrate 120 is disclosed herein. In the active area AA of the first substrate 120, elements configuring a plurality of sub pixels PXL are positioned thereon. In the active area AA, a plurality of divided common electrodes 138 are arranged. Referring to FIG. 1, a plurality of sub-pixels PXL, for example forty eight sub-pixels PXL and four divided common electrodes 138, may be arranged at the active area AA, but the present disclosure is not limited thereto. Each of the divided common electrode 138 may be overlapped with corresponding twelve sub-pixels PXL, but the present disclosure is not limited thereto. Accordingly, storage capacitors CS are configured at the overlapped area of each of the divided common electrodes 138 and the corresponding sub-pixels, for example the twelve sub-pixels PXL that are overlapped with the corresponding divided common electrode 138, configure storage capacitors. In addition, the twelve sub-pixels PXL arranged on each of the divided common electrodes 138 may be categorized into red sub-pixels PXL, green sub-pixels PXL and blue sub-pixels. For example, the size of a sub-pixel PXL may be formed of 20 μm in horizontal direction and 60 μm in vertical direction, and the size of a divided common electrode 138 may be formed of 5000 μm in horizontal direction and 5000 μm in vertical direction. In such case, one of the divided common electrodes 138 can be overlapped with at least 20,000 sub-pixels PXL. However, the numbers and the sizes of the divided common electrode 138 are merely illustrative for the sake of explanation, and the present disclosure is not limited thereto.

A gate driver 142, a data driver 144 and a flexible circuit board 148 are positioned at the periphery area PA of the first substrate 120.

The gate driver 142 is configured to supply driving signals to a plurality of gate lines 130, activate each of the sub-pixels PXL corresponding to the gate line 130, thereby allowing the data signals to be inputted into the sub-pixels PXL of the active area AA.

The data driver 144 is configured to precisely control intervals and frequencies of the data signals and control signals, thereby inputting the received digital data signals into the sub-pixels PXL of the active area AA The flexible circuit board 148 is configured to receive the digital data signals and transfer to the data driver 144.

The first substrate 120 is formed of a material, which is appropriate for depositing a semi-conductor material, a metal line, an organic material, or an inorganic material. For example, the first substrate 120 can be selected from a glass or a polyimide, in which the heat-resistance and chemical-resistance property are excellent.

The liquid crystal layer 122 is interposed between the first substrate 120 and the second substrate 124, wherein an electric field is generated between a pixel electrode 136 on the first substrate 120 and the divided common electrode 138 on the first substrate 120, thereby controlling the liquid crystal layer 122.

Thus, the liquid crystal layer 122 is configured to be rotated, thereby passing the axis of the polarized light through the first polarizer film 118, which is rotated. In such case, the degree of the rotation of the liquid crystal layer 122 is controlled in accordance with the strength of the electric field generated by each sub-pixels PXL.

Moreover, the polarized light, in which the axis of the polarized light is rotated by the liquid crystal layer 122, is absorbed by the second polarizer film 126. In such case, the rate of the absorption is determined by the degree of the rotation of the liquid crystal layer 122.

The liquid crystal layer 122 in the present disclosure means that it has both a fluidity characteristic such as the characteristic of liquid and a long-range order characteristic such as the characteristic of solid at the same time. In fact, the layer includes the molecules of the liquid crystal having a characteristic of intermediate state between liquid and solid. For example, the molecules of the liquid crystal may be in the form of a stick. The molecules of the liquid crystal has anisotropic characteristic such that molecules of the liquid crystal that are in parallel with the major-axis (apse line) and molecules of the liquid crystal that are vertical to the major-axis have different properties. The molecules of the liquid crystal have dielectric anisotropic properties, in which the dielectric constant of the major-axis ($\varepsilon \parallel$) and the dielectric constant of the minor-axis ($\varepsilon \perp$) that is vertical to the major axis are different.

The sealing material 128 is configured to surround the boundary of the liquid crystal layer 122. The liquid crystal layer 122 has a flow-ability characteristic, therefore, it is sealed between the first substrate 120 and the second substrate 124 by the sealing material 128. Moreover, the sealing material 128 is configured to firmly hold the first substrate 120 and the second substrate 124. The sealing material 128 may be cured by heat or ultraviolet light. The sealing material 128 may be formed on the first substrate 120 or the second substrate 124.

The second substrate 124 is configured to realize colors from the polarized light, which is controlled by the electric field generated at the first substrate 120 and passed through the liquid crystal layer 120. Color filters are arranged at the second substrate 124 corresponding to each of the sub-pixels. In the present disclosure, the term "color filter substrate" may be defined as the substrate including elements that are capable of realizing the colors and is positioned thereon.

The second substrate 124 is formed of a material which is appropriate for depositing a semi-conductor material, a metal line, an organic material, or an inorganic material. For example, the second substrate 124 can be selected from a glass or a polyimide, in which the heat-resistance and chemical-resistance property are excellent.

Figure 2:
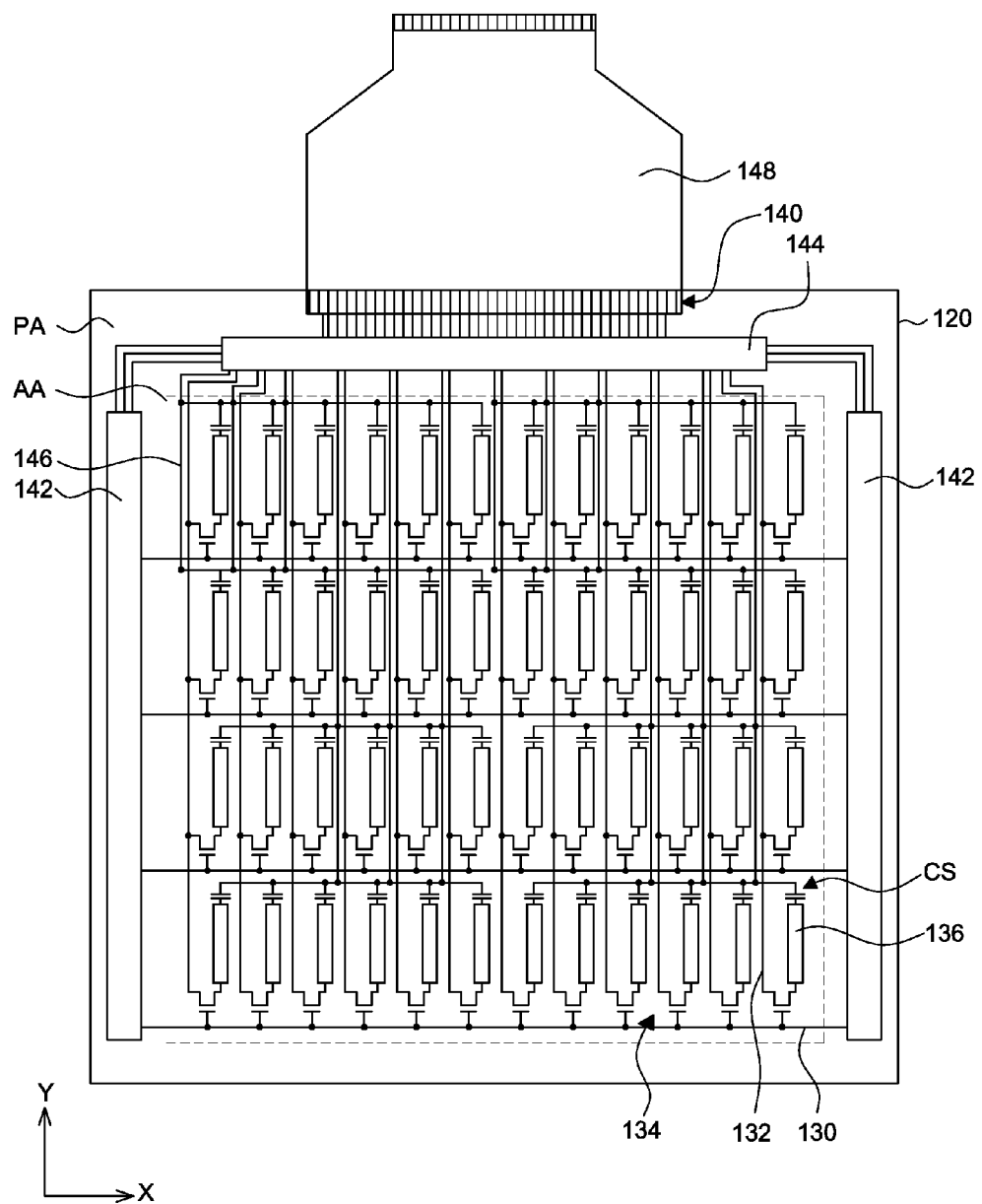
FIG. 2 is a schematic circuit diagram provided to describe an array substrate of the liquid crystal display apparatus according to an exemplary embodiment of the present disclosure.

Referring to FIG. 2, the characteristics of the first substrate 120 in terms of circuitry is disclosed in detail.

FIG. 2 is a schematic circuit diagram provided to describe an array substrate of the liquid crystal display apparatus according to an exemplary embodiment of the present disclosure.

At least a pad unit 140, a gate driver 142, and a data driver 144 are positioned at the periphery area PA.

The pad unit 140 is positioned at least one side of the periphery area PA. An adhesive member is positioned on the pad unit 140. An anisotropic conductive film (ACF) may be used as the adhesive member. In particular, the conventional soldering technique generates high temperature. Therefore, there are difficulties in adapting the conventional soldering technique to the liquid crystal display apparatus 100. Accordingly, the anisotropic conductive film, which generates relatively lower temperature than the conventional soldering technique, is preferred. The anisotropic conductive film includes a plurality of conductive members dispersed therein and the plurality of the conductive members are configured to be connected by applied heat and pressure. That is, the anisotropic conductive film adheres to the pad unit 140 and a circuit component with a specific adhesiveness. Moreover, the plurality of the conductive members within the anisotropic conductive film electrically connects the pad unit 140 and the circuit component thereon. But the present disclosure is not limited thereto.

A flexible printed circuit board 148 (FPCB) is adhered on the pad unit 140. According to the configuration as described above, the liquid crystal display apparatus 100, which can receive digital data signal that is passed through the flexible printed circuit board 148, is transmitted from an external device. But the pad unit 140 is not limited thereto, and the scope of the pad unit 140 should be broadly construed, so as to include any area configured to mount any circuit components such as a flexible cable or a semi-conductor chip by the adhesive member.

The data driver 144 is configured to be positioned on at least one side of the periphery area PA of the liquid crystal display apparatus 100. The data driver 144 is configured to receive a digital data signal, various reference voltages and various control signals from the external system, and control the liquid crystal display panel 104 such that an image is displayed on the active area AA of the liquid crystal display panel 104, and control added functions.

The data driver 144 is configured to receive control signals for realizing the added functions. To perform the added functions, the data driver 144 is configured to be electrically connected to the pad unit 140 with lines or wires.

The data driver 144 is configured to supply the data signal to the active area AA. To supply the data signal, the data driver 144 is configured to be electrically connected to the sub-pixels PXL within the active area AA. In particular, the data driver 144 is configured to be electrically connected to the sub-pixels PXL by a plurality of data lines 132.

The data driver 144 may be configured to control the gate driver 142. To control the gate driver 142, the data driver 144 is configured to be electrically connected to the gate driver 142 with lines or wires.

The data driver 144 may be configured to perform as a processor, a memory, a look-up table, a buffer, a gamma voltage controller, a power controller and more. The data driver 144 is realized as a semi-conductor chip, but is not limited thereto, and can be realized as a plurality of semi-conductor chips.

The data driver 144 is configured to precisely control intervals and frequencies of the data signals and control signal. Various signals output from the data driver 144 may include a polarity inversion signal (INV), a gamma voltage, a gate high voltage (VHG), a gate low voltage (VGL), a gate start pulse (GSP), a gate out enable (GOE), a dot clock and extra. But the present disclosure is not limited thereto.

The data driver 144 generates a gamma voltage, thereby converting the digital data signal into an analogue voltage. That is, the gamma voltage is the reference voltage used for converting the digital data signal into an analogue data signal. For example, the gamma voltage can be configured to generate 256 analogue voltage steps to express 8-bits gray levels. But the present disclosure is not limited thereto, and the gamma voltage can be configured for expressing various bits. For example, the gamma voltage can be configured to generate 1024 analogue voltage steps to express 10-bits gray levels.

The data driver 144 may generate gate high voltage and gate low voltage and supply to the gate driver 142. The gate high voltage and the gate low voltage are the voltages for switching on-off the thin-film-transistors of the sub-pixels PXL of the active area AA.

The data driver 144 generates the polarity inversion signal and controls the polarity of the gamma voltage with the polarity inversion signal. The polarity inversion signal may suppress the liquid crystal layer 122 from being damaged by inverting the polarity of the electric field applied to the liquid crystal layer 122 for a specific period. Depending on the polarity inversion signal, the polarity of the data signal is changed for a predetermined period. That is, the polarity of the data signal is changed over to a positive voltage or a negative voltage for a predetermined period.

The data driver 144 is configured to generate a common electrode driving signal for controlling the plurality of the divided common electrodes 138. To control the plurality of the divided common electrodes 138, the data driver 144 is configured to be electrically connected to the plurality of the divided common electrodes 138 within the active area AA. In particular, the data driver 144 is configured to be electrically connected to the plurality of the divided common electrodes by a plurality of common electrode lines 146. The common electrode driving signal is configured to manage a specific time period for applying a voltage for displaying an image to the sub-pixels PXL, and another specific time period for applying a voltage for performing added functions to the sub-pixels PXL.

The added functions which can be realized by the plurality of the divided common electrodes 138 of the liquid crystal display apparatus 100 is briefly described below.

According to an embodiment of the present disclosure, a liquid crystal display apparatus 100 having a plurality of divided common electrodes 138, in which a touch sensing function can be realized by the plurality of the divided common electrodes that is configured to perform as a plurality of touch electrodes, wherein the plurality of touch electrodes is capable of sensing a change in self-capacitance.

According to an embodiment of the present disclosure, a liquid crystal display apparatus 100 has a plurality of divided common electrodes 138, in which a power saving function can be realized by the plurality of divided common electrodes 138, wherein each of the plurality of divided common electrodes are individually operable. Thus, power consumption of a specific divided common electrode 138 can be reduced.

According to an embodiment of the present disclosure, a liquid crystal display apparatus 100 has a plurality of divided common electrodes 138, wherein each of the divided common electrodes 138 is individually operated when a rapid rotation speed of the liquid crystal is required. For example, when an image data is changed from low gray level to high gray level, to increase a response speed, an over-driving function can be realized such that an electric potential between a specific divided common electrode 138 and corresponding pixel electrode 136 can be increased for a specific time period.

The present disclosure is not limited to those embodiments as described above, and various functions may be added according to various driving algorithms.

In some embodiments, a common voltage driver, configured to control the common electrode driving signal, may be separated from the data driver 144. According to the configuration as described above, there is an advantage that the conventional data driver can be used for the data driver 144.

In some embodiments, the data driver 144 may be mounted on the flexible printed circuit board 148 or the flexible cable in a form of chip on film (COF), instead of being mounted on the periphery area PA of the first substrate 120. Moreover, the flexible printed circuit board or the flexible cable, in which the data driver 144 is mounted thereon, may be adhered on the pad unit 140 of the first substrate 120.

The gate driver 142 is configured to be positioned at least one side of the periphery area PA of the liquid crystal display apparatus 100. The gate driver 142 is configured to receive various control signals from the data driver 144 and control the liquid crystal panel 104 for displaying an image at the active area AA of the liquid crystal display apparatus 100.

The gate driver 142 is configured to supply driving signals to the plurality of gate lines 130 such that status of the thin-film-transistors 134 within the active area AA is switched on or off. To be specific, the gate high voltage or the gate low voltage are supplied to the plurality of the gate lines 130, thereby switching the status of the plurality of the thin-film-transistors 134, which are electrically connected to the plurality of the gate lines 130.

To perform the function as described above, the gate driver 142 is configured to be electrically connected to the plurality of gate lines 130.

If the thin-film-transistor 134 is turned on by the signal supplied from the gate driver 142, the data signal is supplied to the pixel electrode 136. The gate driver 142 is configured to include at least a buffer, a level shifter and a shift register for performing the function as described above.

The gate driver 142 may be realized in a form of gate-driver in panel (GIP) type, in which a gate driver is integrated within a liquid crystal display panel. The gate driver of gate-driver in panel type is configured to be formed by the same manufacturing process of the thin-film-transistor 134 formed on the first substrate 120, which is positioned at the periphery area PA.

In some embodiments, the gate driver 142 is configured to be a semi-conductor chip which has a specific number of channels, wherein the gate driver 142 may be mounted on the periphery area PA of the first substrate 120 in a form of chip on film (COF) or chip on glass (COG).

At the active area AA, at least a plurality of gate lines 130, a plurality of data lines 132, a plurality of thin-film-transistors 134, a plurality of pixel electrodes 136, a plurality of divided common electrodes 138, a plurality of storage capacitor Cs and a plurality of the first common electrode lines 146 are positioned. The plurality of storage capacitors Cs (referring to FIG. 2) are formed by the pixel electrode 136 of each of sub-pixels PXL which is overlapped with each of divided common electrodes 138 (referring to FIG. 1).

The gate line 130 is configured to be extended along with the first direction of the active area AA. Referring to FIG. 2 the x-axis is illustrated as the first direction. The gate lines 130 are, for example, illustrated as four gate lines (referring to FIG. 2) but the number of the gate lines 130 are not limited thereto, and may vary according to the number of sub-pixels PXL arranged within the active area AA.

The gate line 130 may be formed of a metallic material, preferably having low electrical resistivity. For example, the gate line 130 may be formed of copper (Cu), aluminum (Al), molybdenum (Mo), titanium (Ti) or the like, or alloy thereof. But the present disclosure is not limited thereto.

The data line 132 is configured to be extended along with the second direction of the active area AA. Referring to FIG. 2 the y-axis is illustrated as the second direction. The data lines 132 are, for example, illustrated as twelve data lines (referring to FIG. 2) but the number of the data lines 132 are not limited thereto, and may vary according to the number of sub-pixels PXL arranged within the active area AA.

The data line 132 may be formed of a metallic material, preferably having low electrical resistivity. For example, the data line 132 may be formed of copper (Cu), aluminum (Al), molybdenum (Mo), titanium (Ti) or the like, or alloy thereof. But the present disclosure is not limited thereto.

The thin-film-transistor 134 is positioned adjacent to the intersection of the gate line 130 and the data line 132. When the driving signal is output to the gate line 130 that is connected to the thin-film-transistor 134, the thin-film-transistor 134 is switched on.

The pixel electrode 136 is configured to be electrically connected to one end of the thin-film-transistor 134. The pixel electrode 136 is configured to receive data signal transmitted through the data line 132 when the thin-film-transistor 134 is switched on.

One end of a storage capacitor Cs is configured to be electrically connected to a pixel electrode 136. The other end of the storage capacitor Cs is configured to be electrically connected to the divided common electrode 138. Referring to FIG. 1, each of the plurality of the divided common electrodes 138 is overlapped with twelve pixel electrodes 136, and consequently, the other end of the twelve storage capacitors Cs are electrically connected to one of the plurality of the divided common electrode 138.

Accordingly, if common voltage is applied to one of the divided common electrodes 138, the common voltage is applied at the other end of the corresponding twelve storage capacitors Cs. In addition, for example, four different common voltages may be applied to each of four different areas of the active area AA. But the number of the storage capacitors Cs is not limited thereto, and may vary according to the number of pixel electrodes 136 arranged within each of the divided common electrodes 138.

The first common electrode line 146 is configured to be extended along with the second direction of the active area AA. Referring to FIG. 2, for example, twelve first common electrode lines 146 are arranged, but the number of the first common electrode lines 146 are not limited thereto, and may vary according to the number of sub-pixels PXL arranged within the active area AA.

A specific number of the first common electrode lines 146 among the plurality of the first common electrode lines 146 are electrically connected to a specific divided common electrode 138.

Referring to FIG. 2, first to third common electrode lines 146 from the left side are electrically connected to the divided common electrode 138 positioned at the left-upper side of the active area AA. Fourth to sixth common electrode lines 146 from the left side are electrically connected to the divided common electrode 138 positioned at the left-bottom side of the active area AA. Seventh to ninth common electrode lines 146 from the left side are electrically connected to the divided common electrode 138 positioned at the right-upper side of the active area AA. Tenth to twelfth common electrode lines 146 from the left side are electrically connected to the divided common electrode 138 positioned at the left-bottom side of the active area AA. According to the configuration as described above, each of the divided common electrodes 138 can be driven individually by each of the first common electrode lines 146, and there is an advantage of applying different voltages to each of the divided common electrodes 138.

The first common electrode line 146 may be formed of a metallic material, preferably having low electrical resistivity. For example, the first common electrode line 146 may be formed of copper (Cu), aluminum (Al), molybdenum (Mo), titanium (Ti) or the like, or alloy thereof. But the present disclosure is not limited thereto.

Figure 3:
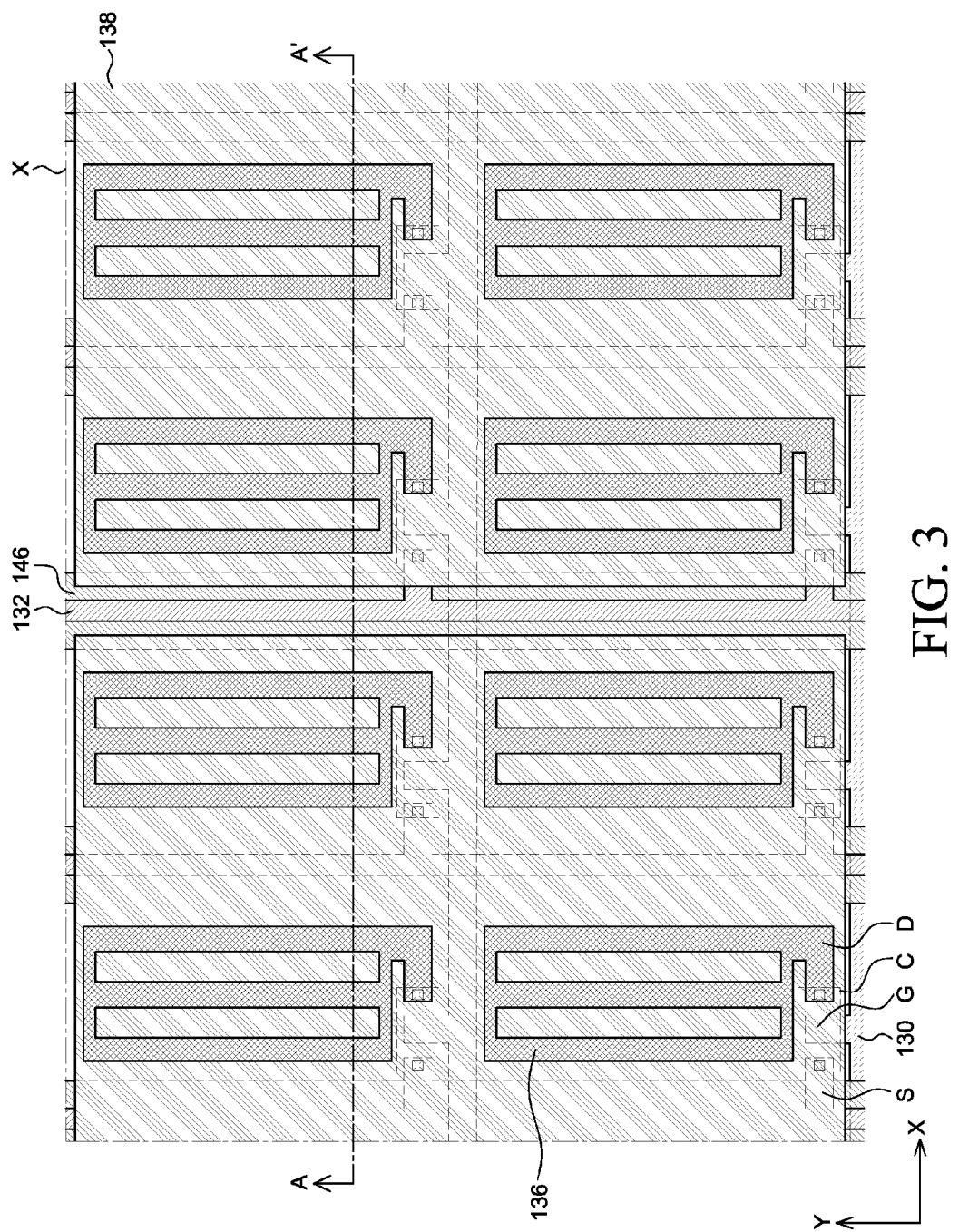
FIG. 3 is a schematic plan view of area X illustrated in FIG. 1 of the liquid crystal display apparatus according to an exemplary embodiment of the present disclosure.

Referring to FIG. 3, the area X of the first substrate 120 as illustrated in FIG. 1 will be described below in detail.

FIG. 3 is a schematic plan view of area X illustrated in FIG. 1 of the liquid crystal display apparatus according to an exemplary embodiment of the present disclosure. Eight sub-pixels PXL are arranged within the area X as an example.

The gate line 130 is extended along with the first direction. The data line 132 is extended along with the second direction. The first common electrode line 146 is extended along with the second direction. But the present disclosure is not limited thereto, and the gate line 130 may be extended along with the second direction but also the data line 132 may be extended along with the first direction.

The first common electrode line 146 and the data line 132 can be extended along with the same direction. According to the configuration as described above, the first common electrode line 146 and the data line 132 are arranged in the same direction, for example, if the first common electrode line 146 and the data line 132 are connected to the data driver 144, the data driver has an advantage of simultaneously supplying specific voltages or signals to each of the divided common electrode 138 and the pixel electrode 136. The thin-film-transistor 134 is positioned adjacent to the intersection of the gate line 130 and the data line 132. The pixel electrode 136 is positioned at the section determined by the intersection of the gate line 130 and the data line 132. Or in case a pixel electrode 136 and another adjacent pixel electrode 136 share a data line 132, the pixel electrode 136 may be positioned at active area AA. But the present disclosure is not limited thereto.

The thin-film-transistor 134 is configured to include a gate electrode G, a source electrode S, a drain electrode D and a channel unit C. The gate line 130 is configured to be overlapped with the channel unit C and electrically insulated from the channel unit C. The channel unit C may be made of amorphous-silicon (a-Si), low temperature poly-silicon (LTPS), oxide-semi-conductor, or the like. But the present disclosure is not limited thereto.

The gate electrode G of the thin-film-transistor 134 is configured to be electrically connected to the gate line 130. If a driving signal is supplied to the gate electrode G of the thin-film-transistor 134, the status of the channel unit C overlapped with the gate electrode G is switched from off status to on status. If the thin-film-transistor is under on status, the source electrode S and the drain electrode D are electrically connected to by the channel unit C, which is conductive. If the thin-film-transistor is under off status, the source electrode S and the drain electrode D are electrically insulated from each other by the channel unit C, which is non-conductive.

The source electrode S of the thin-film-transistor 134 is configured to be electrically connected to the data line 132. If the thin-film-transistor 134 is under on status, the data signal is transmitted through the thin-film-transistor 134, from source electrode S to drain electrode D, and is supplied from the data line 132.

A plurality of contact holes may be formed at each passivation layer for connecting each electrode of the thin-film-transistor 134.

The pixel electrode 136 is configured to be electrically connected to drain electrode D of the thin-film-transistor 134. Accordingly, a voltage corresponding to the data signal input from the external system can be applied to each of the plurality of the pixel electrodes 136.

The pixel electrode 136 is configured to include at least two ribs arranged along with the second direction or at least one slit formed in the second direction. Referring to FIG. 3, for example, a pixel electrode 136 having three ribs or two slits is illustrated. But the present disclosure is not limited thereto, and the shape of the pixel electrode 136 may be any form capable of realizing in-plane switching with the divided common electrode 138. The pixel electrode 136 is illustrated as a straight line in FIG. 3, but the present disclosure is not limited thereto, and may be formed of zig-zag shape having at least one bending portion.

Each of the divided common electrodes 138 is configured to be overlapped with a plurality of the pixel electrodes 136. The pixel electrode 136 and the divided common electrode 138 is configured to have optical transparency. To be specific, the pixel electrode 136 and the divided common electrode 138 are configured to be transparent electrodes. For example, the transparent electrode is made of indium tin oxide (ITO), indium zinc oxide (IZO), tin oxide (SnO2), zinc oxide (ZnO), graphene, or the like. But the present disclosure is not limited thereto. The divided common electrode 138 is illustrated as a rectangular in FIG. 3, but the present disclosure is not limited thereto.

According to the configuration as described above, the pixel electrode 136 and the divided common electrode 138 have transparent characteristics, and thus, there is an advantage of transmitting the light input from the light source unit 102. Accordingly, the pixel electrode 136 and the divided common electrode 138 can be overlapped from each other.

An overlapped portion of a pixel electrode 136 and a divided common electrode 138 are configured to function as a storage capacitor Cs for storing data signal. In such case, no metallic storage capacitor may be required, and therefore, transparent area for transmitting light may be increased, and there is an advantage of increasing aperture ratio of the active area AA.

Each of the first common electrode lines 146 is configured to be overlapped with each of the data lines 132. In particular, the width of the first common electrode line 146 is configured to be wider than the width of the data line 132. The data line 132 can be configured to be overlapped at the center of the first common electrode line 146 and extended to the second direction. According to the configuration as described above, the data line 132, for the most part, is covered by the first common electrode line 146 from a viewpoint of the light source unit 102. Accordingly, there is an advantage of suppressing a decrease in aperture ratio due to the data line 132.

In some embodiments, shape of the data line 132 and the first common electrode line 146 may be in a shape other than a straight line. More particularly, if the shape of the pixel electrode 136 is non-rectangular, the shape of the data line 132 and the shape of the first common electrode line 146 may be determined according to the shape of the pixel electrode 136. For example, if the shape of the pixel electrode is configured to be a zig-zag shape or a diagonal shape, the shape of the data line 132 and the first common electrode line 146 may be configured to be a zig-zig shape or a diagonal shape instead of a linear shape. In such case, the data line is configured to be extended with such a manner that the data line is positioned at the center of the first common electrode line.

Figure 4:
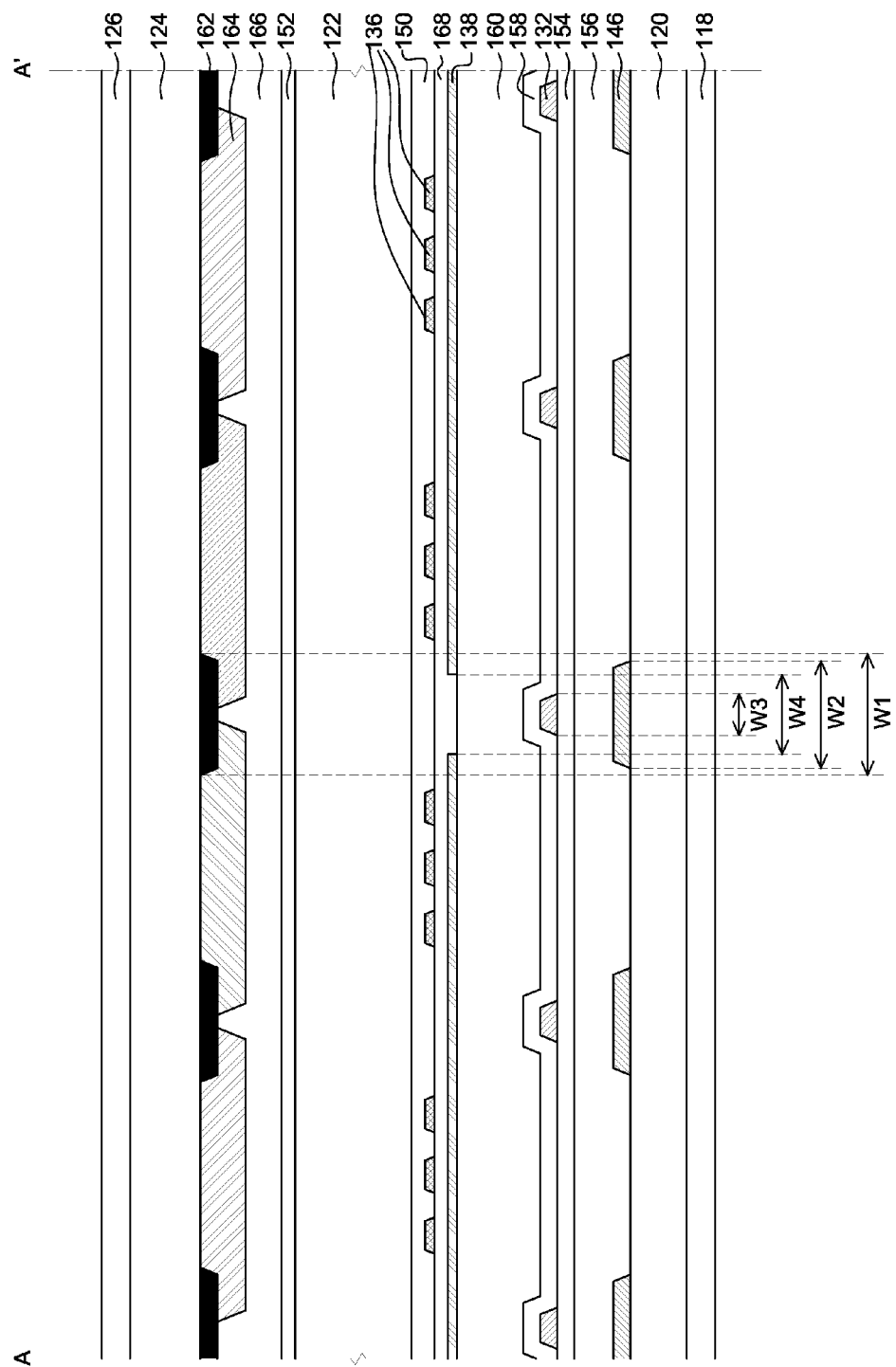
FIG. 4 is a schematic cross-sectional view of the liquid crystal display apparatus according to an exemplary embodiment of the present disclosure taken along line A-A' illustrated in FIG. 3.

Referring to FIG. 3, an opening portion is formed between the divided common electrodes 138 which are separated from each other along the second direction, as illustrated at the center of the area X. Referring to FIG. 4, the structure of the data line 132 and the first common electrode line 146 will be described below in detail.

FIG. 4 is a schematic cross-sectional view of the liquid crystal display apparatus according to an exemplary embodiment of the present disclosure taken along line A-A' illustrated in FIG. 3. Referring to FIG. 4, a schematic cross-sectional view taken along line A-A' of the area X of the liquid crystal panel 104 will be described in detail.

The liquid crystal panel 104 includes a first polarizer film 118, a first substrate 120, a first common electrode line 146, a first planarization layer 156, a first passivation layer 154, a data line 132, a second passivation layer 158, a second planarization layer 160, a divided common electrode 138, a third passivation layer 166, a pixel electrode 136, a first alignment layer 150, a liquid crystal layer 122, a second alignment layer 152, a third planarization layer 166, a color filter 164, a black matrix 162, a second substrate 124 and a second polarizer film 126.

The first polarizer film 118 is positioned under the rear surface of the first substrate 120. Redundant features of the first polarizer film 118 will be omitted merely for the sake of the brevity.

The first common electrode line 146 is positioned on the first substrate 120. Redundant features of the first common electrode line 146 will be omitted merely for the sake of the brevity.

The first planarization layer 156 is positioned on the first common electrode line 146. The cross-section of the first common electrode line is configured to have a second width W2.

The first passivation layer 154 is positioned on the first planarization layer 156. The first planarization layer 156 electrically insulates the first common electrode line 146 and the data line 132.

The first planarization layer 156 is configured to have certain features at one time so that the added function, which is implemented to the liquid crystal display apparatus 100 having the divided common electrodes 138, is appropriately implemented.

Firstly, the first planarization layer 156 is made of an inorganic material having a planarization characteristic.

Secondly, the thickness of the first planarization layer 156 may be configured to be at least 0.8 μm or 8,000 Å.

The first planarization layer 156 may be formed by a manufacturing method of silicon on glass (SOG) technique, in which a silicon material in the form of gel that is coated on the first substrate 120 then planarized may be applied for forming the first planarization layer 156 having the above-described features. For example, the first planarization layer 156 may be formed to be planarized with an inorganic material such as silicon oxide (SiOx), silicon nitride (SiNx) or the like with a thickness of 10,000 Å which is manufactured by the SOG technique.

In addition, the upper surface of the inorganic layer, which is deposited by the chemical vapor deposition (CVD) technique, has a conformal characteristic which is not planarized and this deposition technique is regarded as the conventional deposition method. Consequently, there is a difficulty in forming an inorganic layer having a planarization characteristic with the chemical vapor deposition technique.

A need for positioning the thin-film-transistor 134 on the first planarization layer 156 is due to the first planarization layer 156, which should be made of an inorganic material having a planarization characteristic. If the surface where the thin-film-transistor 134 is positioned on is not flat, performance degradation or fault may occur in the thin-film-transistor 134. If the planarization layer is made of an organic material, the planarization layer may be damaged when the thin-film-transistor 134 is formed directly on the planarization layer.

There is a need for reducing the parasitic capacitance between the first common electrode line 146 and the data line 132 due to the thickness of the first planarization layer 156, which should be at least 8,000 Å. To be specific, the first common electrode line 146 and the data line 132 are overlapped with each other. Consequently, the value of the parasitic capacitance between the first common electrode line 146 and the data line 132 may be increased in proportion to the width and the length of the first common electrode line 146 and the data line 132. However, if the thickness of the first planarization layer 156 is at least 0.8 µm, the value of the parasitic capacitance can be sufficiently reduced. If the parasitic capacitance is too large, the data signal transmitted through the data line 132 to the pixel electrode 136 may be inaccurately applied. As a result, the image quality can be degraded. Moreover, the common voltage may be inaccurately applied to the divided common electrode 138. As a result, the added function may not be properly implemented.

The data line 132 is positioned on the first passivation layer 154. The first passivation layer 154 electrically insulates the gate line 130 and the data line 132. For example, the first passivation layer 154 may be a gate insulation layer. Since the gate line 130 does not cross the cross-sectional view taken along line A-A', the gate line 130 is not shown in FIG. 4. In addition, the channel unit C (not shown in FIG. 4 as the same reason as the gate line 130) is positioned on the first passivation layer 154.

The first passivation layer 154 is made of an inorganic material. For example, the first passivation layer 154 may be made of silicon oxide (SiOx), silicon nitride (SiNx) or aluminum oxide (Al$_2$O$_3$). But the present disclosure is not limited thereto.

The data line 132 is positioned on the first passivation layer 154. The cross-section of the data line 132 is configured to have a third width W3.

The line resistance of the first common electrode line 146 is configured to be lower than the line resistance of the data line 132. To be specific, the area of a divided common electrode 138 of the liquid crystal display apparatus 100 is configured to be significantly larger than the area of a pixel electrode 136. If the area of the electrode become larger, the amount of the load applied to the line connecting the electrode is increased in proportion to the area of the electrode. Consequently, the line resistance of the first common electrode line 146, which is connected to a divided common electrode 138, should be configured to be lower than the line resistance of the data line 132. If the line resistance of the data line 132 is not sufficiently low, the added function to be implemented to the liquid crystal display apparatus 100 may not be properly implemented.

To be more specific to the line resistance, each line is configured with a specific conductive material. Each of the conductive materials has its own resistivity ρ. The line resistance can be determined by the resistivity ρ, the line length L, the line thickness T and the line width W. The line resistance may be calculated by the equation 1.

$$\text{Line resistance} = \frac{\text{line length } L \times \text{resistivity } \rho}{\text{line thickness } T \times \text{line width } W} \quad \text{[Equation 1]}$$

Referring to the equation 1, for reducing the line resistance of the first common electrode line 146, the width W2 of the cross-section of the first common electrode line 146 should be wider than the width W3 of the cross-section of the data line 132. According to the configuration as described above, the first common electrode line 146 may handle the load of the divided common electrode 138.

Furthermore, there is an advantage of reducing the line resistance without increasing the thickness of the first common electrode line 146. Particularly, if the thickness of the first common electrode line 146 is increased, the distance from the data line 132 becomes closer, thereby increasing the value of the parasitic capacitance.

If the position of the first common electrode line 146 and that of the data line 132 are swapped (or exchanged), a portion of the first common electrode line 146 will be overlapped with a portion of the divided common electrode 138. Accordingly, a problem of an increase in parasitic capacitance may occur due to such position swapping, since the value of the parasitic capacitance between the first common electrode line 146 and the divided common electrode 138 will be increased even though the value of the parasitic capacitance between the first common electrode line 146 and the data line 132 remains the same. Consequently, the first common electrode line 146 may be located under the data line 132. But the present disclosure is not limited thereto.

Regarding the issues as discussed above, the first common electrode line 146 may be positioned under the data line 132 and the first common electrode line 146 may be positioned under the thin-film-transistor 134 as the data line 132 should be connected to the thin-film-transistor 134.

The first common electrode line 146 is configured to be electrically connected to the divided common electrode 138 through at least one contact hole configured to penetrate the first passivation layer 154, first planarization layer 156, the second passivation layer 158 and the second planarization layer 160.

The second passivation layer 158 is positioned on the data line 132. The second passivation layer 158 is configured to protect the thin-film-transistor 134, however, this element is not essential, and therefore, the second passivation layer 158 can be omitted.

The second passivation layer 158 is made of an inorganic material. For example, the second passivation layer 158 may be made of silicon oxide (SiOx), silicon nitride (SiNx) or aluminum oxide (Al2O3). But the present disclosure is not limited thereto.

The second planarization layer 160 is positioned on the data line 132. The second planarization layer 160 is configured with an organic material having a low permittivity ε.

For example, the second polarization layer 160 may be made of photo-acrylic or polyimide which has a low permittivity characteristic with at least 1 µm thickness. But the present disclosure is not limited thereto.

The divided common electrode 138 is positioned on the second planarization layer 160. The divided common electrodes 138 are arranged and spaced apart from each other at a specific distance. The area where the divided common electrodes 138 are not formed may be defined as an opening portion. The width W4 of the cross-section of the opening portion is configured to be wider than the width of the cross-section of the data line 132. According to the configuration as described above, the divided common electrode 138 and the data line 132 are not mutually overlapped, and thus, there is an advantage of reducing the value of the parasitic capacitance between the data line 132 and the divided common electrode 138.

In some embodiments, the width W2 of the cross-section of the first common electrode line 146 can be configured to be wider than the width W4 of the cross-section of the opening portion. In such case, there is an advantage of reducing the value of the parasitic capacitance between the first common electrode line 146 and the divided common electrode 138 even though the first common electrode line 146 and the divided common electrode 138 are overlapped. This is because of the first common electrode line 146 and the divided common electrode 138 that are spaced apart according to the thickness of the first planarization layer 156 and the second planarization layer 160. Accordingly, a portion of the first common electrode line 146 can be positioned to be overlapped with a portion of the opening portion and a portion of the divided common electrode 138 adjacent to the opening portion. Furthermore, the width of the cross-section of the first common electrode line 146 is configured to be at least 1 µm wider than the width W4 of the cross-section of the opening portion. In such case, the line resistance of the first common electrode line 146 can be reduced and the thickness of the first common electrode line can be thinner. But the present disclosure is not limited thereto.

In some embodiments, the data line 132 and the first common electrode line 146 are configured to be swapped. However, in this case, the width W3 of the cross-section of data line 132 should be wider than the width W2 of the cross-section of the first common electrode line 146. Also the width W4 of the cross-section of the opening portion should be wider than the width of the cross-section of the first common electrode line 146.

The third passivation layer 166 is configured to cover the divided common electrodes 138 and the opening portion.

The third passivation layer 166 is made of an inorganic material. For example, the third passivation layer 166 may be made of silicon oxide (SiOx), silicon nitride (SiNx) or aluminum oxide (Al2O3). But the present disclosure is not limited thereto. In addition, a plurality of contact holes may be formed at the passivation layer for electrically connecting the lines which are electrically insulated by a passivation layer.

The pixel electrode 136 is positioned on the third passivation layer 166. Accordingly, the pixel electrode 136 and the divided common electrode 138 are insulated by the third passivation layer 166. An electric field is generated by voltages applied to the pixel electrode 136 and the divided common electrode 138.

On the other hand, the common electrode is not present at the opening portion. Therefore, the strength of the electric field generated at the opening portion is different from the strength of the electric field generated at the area where the common electrode is present. Therefore, at the opening portion, there is a difficulty in controlling the liquid crystal. As a result, there is a difficulty in controlling the axis of the polarized light. Consequently, light leakage or color-washout problem may occur at the opening portion. In particular, this light leakage or color-washout problem can be worse from the side viewing angle than the front viewing angle.

The color-washout refers to the case, in which the light supplied from the light source unit 120, passes through the adjacent color filter 164 instead of passing through the color filter 164 corresponding to the pixel electrode 136.

Referring to FIG. 4, the color-washout phenomenon is described in detail. The light, in which the axis of the polarized light controlled by the data signal applied to the pixel electrode 136 adjacent to the right side of the opening portion, can express the desired color when the light passes through the color filter 162 positioned vertical to the corresponding pixel electrode 136. In case, if the light, in which the axis of the polarized light controlled by the data signal applied to the pixel electrode 136 adjacent to the right side of the opening portion, passes through the color filter 162 adjacent to the left side of the opening portion will mix-up colors. Therefore, the image quality can be degraded.

The width W2 of the cross-section of the first common electrode line 146 is configured to be wider than the width W3 of the cross-section of the data line 132 for reducing the color-washout problem as described above.

According to the configuration as described above, there is an advantage of suppressing the light passing through the opposite color filter 162 around the opening portion. Moreover, as described above, there is another advantage of reducing the line resistance of the first common electrode line 146 such that the capability of handling the load of the divided common electrode 138 is increased. Furthermore, there is other advantage of reducing the value of the parasitic capacitance if the width W2 of the cross-section of the first common electrode line 146 is increased, which can provide a room for reducing the thickness of the first common electrode line 146. Therefore, the distance from the data line 132 can be increased.

That is, the first common electrode line 146 having a wider width than the width W3 of the cross-section of the data line 132 can be configured to function as the color-washout reducing layer.

To be specific, the inventor of the present disclosure analyzed through various tests that color-washout problem is significantly observed if the width W4 of the cross-section of the opening portion is more than 3 µm. Accordingly, it is suggested that an embodiment of the present disclosure having the color-washout reducing layer is appropriate if the width W4 of the cross-section of the opening portion is more than 3 µm. But the present disclosure is not limited thereto.

At this time, the center of the cross-section of the first common electrode line 146 and the center of the cross-section of the data line 132 can be aligned in the vertical direction. According to the configuration as described above, the data line 132 is positioned at the center of the first common electrode line 146. Consequently, there is an advantage of equalizing the viewing angle characteristic of the liquid crystal display apparatus 100 for the left side and the right side in view of the cross-section. If the data line 132 is shifted to the left or right side, a problem may arise such that the viewing angle characteristic of the liquid crystal display apparatus 100 becomes asymmetrical.

The first alignment layer 150 is positioned on the pixel electrode 136. The liquid crystal layer 122 is positioned on the first alignment layer 150. The second alignment layer 152 is positioned on the liquid crystal layer 122. The liquid crystal layer 122 is configured to directly contact the first alignment layer 150 and the second alignment layer 152 for aligning the liquid crystal. That is, the liquid crystal layer 122 is configured to be interposed between the first alignment layer 150 and the second alignment layer 152.

The ultra-violet irradiation technique which is a non-contacting alignment method, may be applied for the first alignment layer 150 and the second alignment layer 152. According to the configuration as described above, the polymer chains at the surface of the first alignment layer 150 and the second alignment layer 152 may be aligned in one direction. The liquid crystal of the liquid crystal layer 122 is aligned by a chemical reaction between the polymer chain of the alignment layer and the liquid crystal layer 122. In particular, there is an advantage of reducing the degree of the color-washout or the degree of asymmetric viewing angle problem because of the pre-tilt angle θ of the aligned liquid crystal, which becomes substantially 0°. More particularly, if the pixel electrode 136 and the divided common electrode 138 are positioned on the first substrate 120 for generating an electric field of in-plane switching type, and the first alignment layer 150 and the second alignment layer 152 are formed with ultra-violet irradiation technique which is non-contacting alignment method for substantially 0° of the pre-tilt angle θ of the aligned liquid crystal, then the liquid crystal display apparatus 100 will have an advantage of effectively reducing the degree of the color-washout or the degree of asymmetric viewing angle problem.

For example, the liquid crystal layer 122 is a negative type liquid crystal. The negative type liquid crystal has a smaller dielectric constant of the major-axis (εII) than the dielectric constant of the minor-axis (ε ⊥) which is vertical to the major axis. The cell-gap of the liquid crystal layer 122 or the thickness of the liquid crystal layer 122 is configured to be between 2.8 μm and 3.3 μm. In particular, the cell-gap is configured to be 3 μm. But the present disclosure is not limited thereto.

According to the configuration as described above, there is an advantage of increased maximum transmittance that the maximum luminance, contrast ratio, and the response speed are improved in comparison with the positive type liquid crystal. In addition, if the cell-gap of the negative type liquid crystal is more than 3.4 μm, the response speed of the liquid crystal layer 122 may be decreased. If the cell-gap is below 2.8 μm, controllability of the axis of the polarized light may be decreased. But the present disclosure is not limited thereto.

The third planarization layer 166 is positioned on the second alignment layer 152. The color filter 164 is positioned on the third planarization layer 166. The third planarization layer 166 is configured to planarize (i.e. flatten or smooth out) the steps of the color filter 164. If the third planarization layer 166 is not flat, then the second alignment layer 152 becomes uneven too. Consequently, the liquid crystal layer 122 is misaligned and the image quality of the liquid crystal display apparatus 100 can be degraded.

Referring to FIG. 4, the color filter 164 is illustrated with different hatchings. Each hatching represent the color filter of red bandwidth, greed bandwidth and blue bandwidth.

The black matrix 162 is positioned on the color filter 164. The black matrix 162 is configured to separate the sub-pixels PXL of the liquid crystal display apparatus 100. The width W1 of the cross-section of the black matrix 162 is configured to be wider than the width W2 of the cross-section of the first common electrode line 146. In particular, if the width W1 of the cross-section of the black matrix 162 is narrower than the width W2 of the cross-section of the first common electrode line 146, the first common electrode line 146 may be perceived from the side viewing angle. Or an ambient light may be reflected on the first common electrode line 146 such that the ambient contrast ratio may be reduced.

To be specific, the inventor of the present disclosure analyzed through various tests that if the width W2 of the cross-section of the first common electrode line 162 is configured to be between 60% and 90% of the width W1 of the cross-section of the black matrix 162, the degree of the perception of the first common electrode line 146 is minimized from the side viewing angle. But the present disclosure is not limited thereto.

At this time, the center of the cross-section of the black matrix 162 and the center of the cross-section of the first common electrode line 146 can be aligned in the vertical direction. According to the configuration as described above, the black matrix 162 is positioned at the center of the first common electrode line 146. Consequently, there is an advantage of equalizing the viewing angle characteristic of the liquid crystal display apparatus 100 for the left side and the right side in view of the cross-section.

Furthermore, the black matrix 162 is configured to be overlapped with the first common electrode line 146 at the opening portion.

The second substrate 124 is positioned on the black matrix 162. Redundant features of the second substrate 124 will be omitted merely for the sake of the brevity. The second polarizer film 126 is positioned on the second substrate 124. Redundant features of the second polarizer film 126 will be omitted merely for the sake of the brevity.

Figure 5:
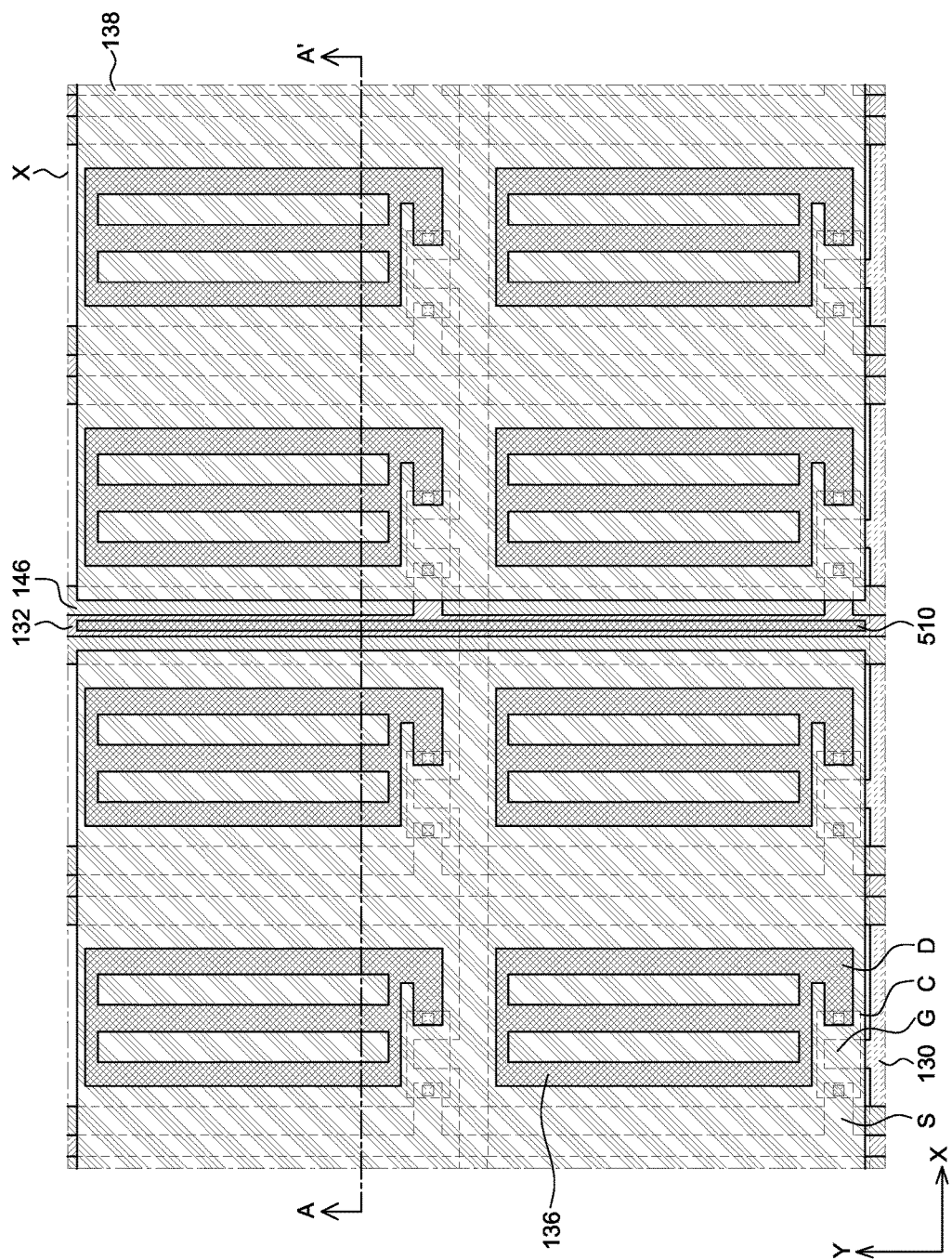
FIG. 5 is a schematic plan view of area X of a liquid crystal display apparatus according to another exemplary embodiment of the present disclosure.
Figure 6:
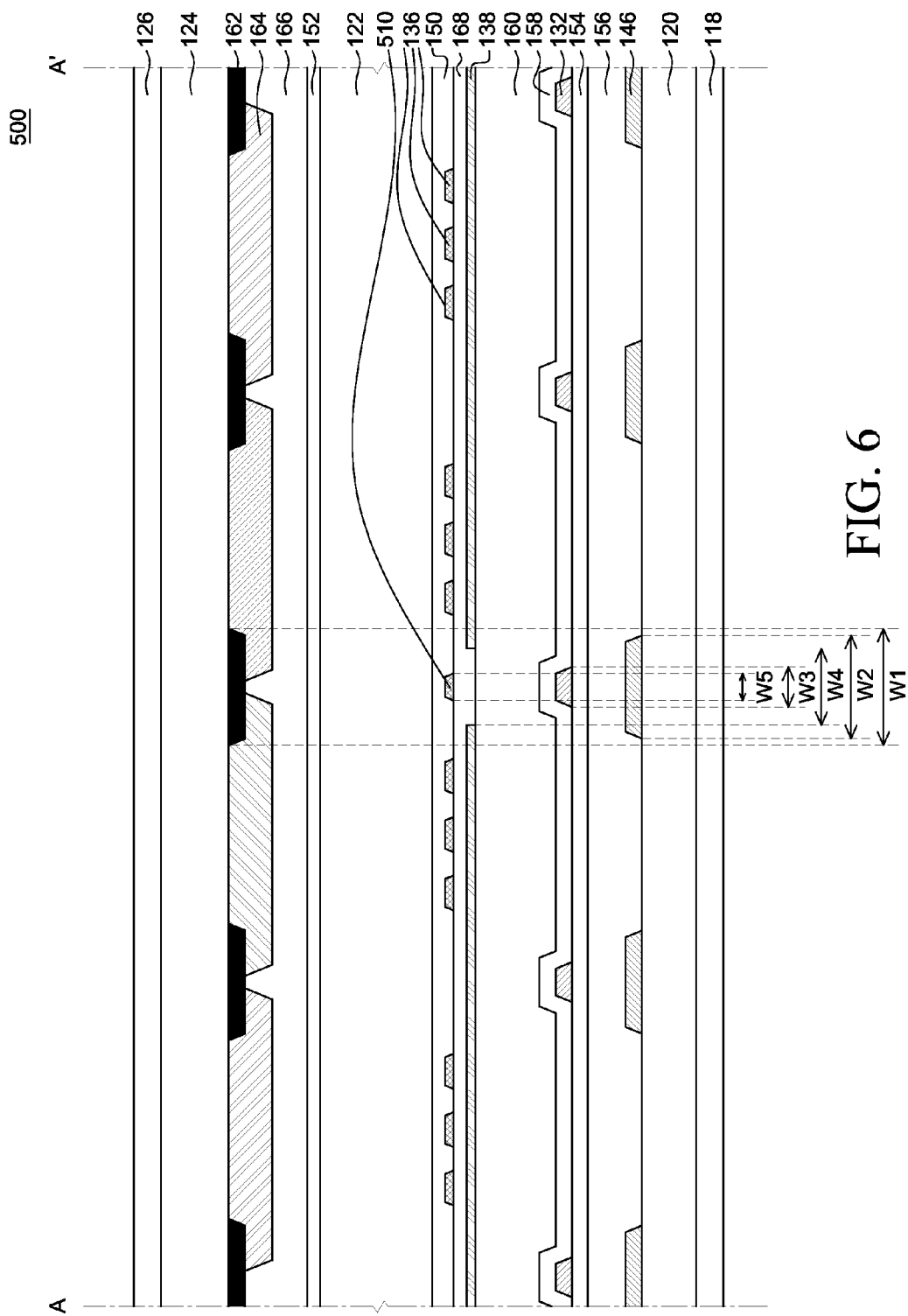
FIG. 6 is a schematic cross-sectional view of the liquid crystal display apparatus according to another exemplary embodiment of the present disclosure taken along line A-A' illustrated in FIG. 5.

Referring to FIG. 5 and FIG. 6, a liquid crystal display apparatus 500 according to another exemplary embodiment of the present disclosure are described.

FIG. 5 is a schematic plan view of area X of a liquid crystal display apparatus according to another exemplary embodiment of the present disclosure. FIG. 6 is a schematic cross-sectional view of the liquid crystal display apparatus according to another exemplary embodiment of the present disclosure taken along line A-A' illustrated in FIG. 5. The light source unit 102 of the liquid crystal display apparatus 500 will be omitted merely for the sake of the brevity.

An auxiliary common electrode 510 is additionally positioned on the data line 132 of the liquid crystal display apparatus 500. At this time, the auxiliary common electrode 510 is configured to be positioned at the opening portion, and the auxiliary common electrode 510 is configured to be positioned on the third passivation layer 166. That is, the auxiliary common electrode 510 is made of the same material as the divided common electrode 138. The width W5 of the cross-section of the auxiliary common electrode 510 is configured to be narrower than the width W4 of the cross-section of the opening portion. According to the configuration as described above, there is an advantage of assisting the generating of an electric field with the pixel electrode 136 at the opening portion. Accordingly, there is an advantage of further reducing the degree of the color-washout phenomenon.

More particularly, the auxiliary common electrode 510 may be configured to be electrically connected to one of the adjacent divided common electrode 138. The auxiliary common electrode 510 and one of the divide common electrode 138 can be connected by forming a contact hole. Moreover, if the auxiliary common electrode 510 is electrically connected to one of the divided common electrode 138, the same voltage can be applied to both of the auxiliary common electrode 510 and the divided common electrode 138.

To be specific, the inventor of the present disclosure analyzed through various tests that if the width W4 of the cross-section of the opening portion is between 5.5 μm and 6.5 μm, the cross-section of the auxiliary common electrode 510 can be between 3 μm and 4 μm for minimizing the color-washout phenomenon of the liquid crystal display apparatus 500. But the present disclosure is not limited thereto.

With the exception of the portions described above, the liquid crystal display apparatus 500 according to another exemplary embodiment of the present disclosure is identical to the liquid crystal display apparatus 100 according to an exemplary embodiment of the present disclosure, and thus redundant features will be omitted merely for the sake of brevity.

Figure 7:
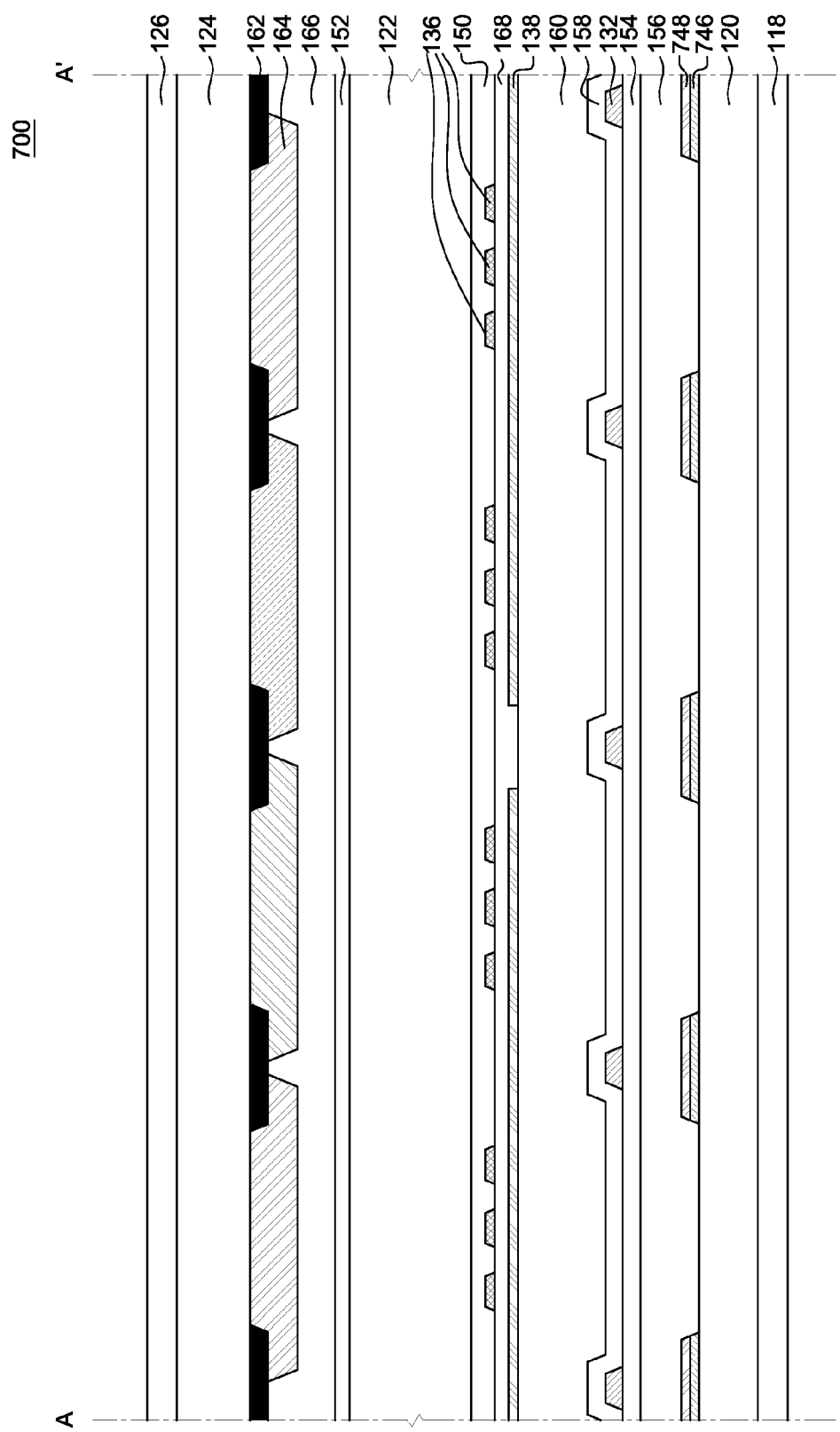
FIG. 7 is a schematic cross-sectional view of area X of a liquid crystal display apparatus according to yet another exemplary embodiment of the present disclosure.

Referring to FIG. 7, a liquid crystal display apparatus 700 according to yet another exemplary embodiment of the present disclosure is described.

FIG. 7 is a schematic cross-sectional view of area X of a liquid crystal display apparatus according to yet another exemplary embodiment of the present disclosure. The light source unit 102 of the liquid crystal display apparatus 700 will be omitted merely for the sake of the brevity.

The liquid crystal display apparatus 700 is configured to include the second common electrode line 746 and the third common electrode line 748 instead of the first common electrode line 146.

The third common electrode line 748 is positioned on the second common electrode line 746. The second common electrode line 746 is exposed to the first substrate 120. The third common electrode line 748 is exposed to the second substrate 124.

The reflectance of the visible wavelengths of the second common electrode line 746 and the reflectance of the visible wavelengths of the third common electrode line 748 are different from each other. The second common electrode line 746 and the third common electrode line 748 are characterized in that different metal layers are stacked to form a structure having at least two layers.

The second common electrode line 746 and the third common electrode line 748 are characterized in that the reflectance of the visible wavelengths of the second common electrode line 746 is higher than the third common electrode line 748.

For example, the second common electrode line 746 may be formed as a general metal line. In general, the metal line has relatively high reflectance characteristic in terms of visible wavelengths. The third common electrode line 748 is configured to include at least one among carbon, nitrogen, or oxygen. According to such configuration, the absorption rate of a metal layer can be increased. The third common electrode line 748, i.e., the uppermost metal layer may be made of copper nitrogen (CuNx) with a thickness more than 250 Å. For example, if the thickness of the metal layer is less than 250 Å, the metal layer may be translucent to the visible wavelengths. Accordingly, the absorption efficiency of the visible wavelengths may be degraded.

According to the configuration as described above, there are advantages for compensating various problems when the width of the common electrode line is widened.

Firstly, if the reflectance of the visible wavelengths of the second common electrode line 746 is high, a portion of the light that is from the light source unit 102 incident to the second common electrode line 746 is reflected back to the light source unit 102 such that the light source is recycled, thereby increasing the luminance of the liquid crystal display apparatus 700.

Secondly, if the absorption of the visible wavelength of the third common electrode line 746 is high, it can function as a black matrix. Accordingly, ambient contrast ratio can be improved.

With the exception of the portions described above, the liquid crystal display apparatus 700 according to yet another exemplary embodiment of the present disclosure is identical to the liquid crystal display apparatus 100 according to an exemplary embodiment of the present disclosure, and thus redundant features will be omitted merely for the sake of brevity.

In some embodiments, the common electrode line may be configured as at least three layers, and at this time, the uppermost metal layer is configured to have lowest reflectance in terms of visible wavelengths and the bottommost metal layer is configured to have highest reflectance in terms of visible wavelengths.

Figure 8:
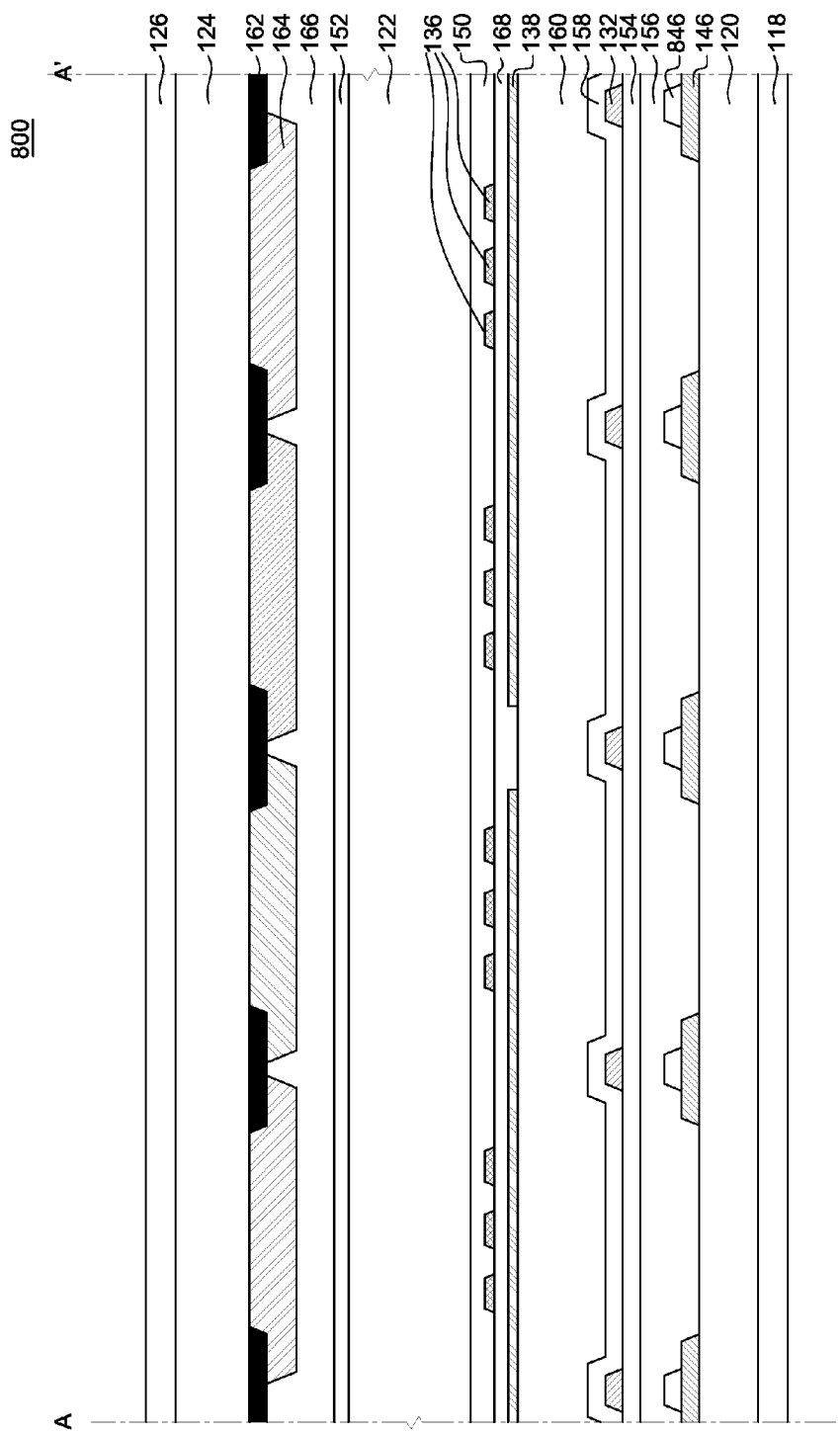
FIG. 8 is a schematic cross-sectional view of area X of a liquid crystal display apparatus according to yet another exemplary embodiment of the present disclosure.

Referring to FIG. 8, a liquid crystal display apparatus 800 according to yet another exemplary embodiment of the present disclosure is described.

FIG. 8 is a schematic cross-sectional view of area X of a liquid crystal display apparatus according to yet another exemplary embodiment of the present disclosure. The light source unit 102 of the liquid crystal display apparatus 800 will be omitted merely for the sake of the brevity.

The liquid crystal display apparatus 800 is configured to further include a fourth common electrode line 846 on the first common electrode line 146. At this time, the shape of the cross-section of the fourth common electrode line 846 is configured to be the same shape as the cross-section of the data line 132.

In particular, the shape of the cross-section of the first common electrode line 146 and the fourth common electrode line 846 may be a tapered stair-like shape.

According to the configuration as described above, there is an advantage of reducing line resistance of the common electrode line by forming an auxiliary common electrode line having the same shape as the data line 132.

With the exception of the portions described above, the liquid crystal display apparatus 800 according to yet another exemplary embodiment of the present disclosure is identical to the liquid crystal display apparatus 100 according to an exemplary embodiment of the present disclosure, and thus redundant features will be omitted merely for the sake of brevity.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purpose only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

What is claimed is:

1. A liquid crystal display apparatus having a plurality of sub-pixels to display an image, comprising:
 a plurality of common electrode lines on a first substrate, the plurality of common electrode lines dividing the plurality of sub-pixels into a plurality of groups of sub-pixels;

a first planarization layer on the plurality of common electrode lines;

a plurality of data lines on the first planarization layer;

a second planarization layer on the plurality of data lines; and a plurality of divided common electrodes on the second planarization layer, each divided common electrode overlapping one of the plurality of groups of sub-pixels, with an opening portion between the plurality of divided common electrodes, wherein the plurality of common electrode lines and the plurality of data lines overlap each other at the opening portion, wherein a width of each of the plurality of common electrode lines is larger than a width of each of the plurality of data lines for reducing a degree of color wash-out phenomenon of neighboring sub-pixels adjacent to the opening portion, wherein the width of the plurality of common electrode lines is larger than the width of the opening portion, wherein the plurality of common electrode lines include at least two stacked metallic layers, wherein a reflectance of visible wavelengths of a bottommost metallic layer of the common electrode lines is higher than a reflectance of visible wavelengths of an uppermost metallic layer of the common electrode lines, and wherein a thickness of the uppermost metallic layer of the common electrode lines is more than 250 Å to increase the absorption efficiency of the visible wavelengths.

2. The liquid crystal display apparatus of claim 1, wherein a portion of the plurality of common electrode lines overlap a portion of each of the divided common electrodes adjacent to the opening portion.

3. The liquid crystal display apparatus of claim 1, further comprising a second substrate having a color filter and a black matrix, wherein the black matrix overlaps the common electrode lines at the opening portion, and wherein a width of the black matrix is larger than the width of the common electrode lines.

4. The liquid crystal display apparatus of claim 1, wherein the first planarization layer is made of an inorganic material and the second planarization layer is made of an organic material.

5. The liquid crystal display apparatus of claim 1, further comprising:

a passivation layer positioned on the plurality of divided common electrodes;

a pixel electrode and an auxiliary common electrode positioned on the passivation layer, and wherein the auxiliary common electrode is positioned at the opening portion.

6. The liquid crystal display apparatus of claim 5, wherein the auxiliary common electrode is configured to be electrically connected to a neighboring divided common electrode among the plurality of the divided common electrodes.

7. The liquid crystal display apparatus of claim 6, wherein a width of the auxiliary common electrode is smaller than the width of the opening portion.

8. The liquid crystal display apparatus of claim 1, wherein the divided common electrode is configured for self-capacitance sensing.

9. The liquid crystal display apparatus of claim 8, wherein the plurality of common electrode lines are extended along with the plurality of the data lines.

10. The liquid crystal display apparatus of claim 1, wherein the uppermost metallic layer of the common electrode lines includes at least one element among carbon, nitrogen and oxygen, and wherein the width of the bottommost metallic layer of the common electrode line is larger than the width of the uppermost metallic layer of the common electrode line.

11. A liquid crystal display apparatus having a plurality of sub-pixels to display an image, comprising:

a liquid crystal panel configured to include a color filter substrate, an array substrate and a liquid crystal layer interposed between the color filter substrate and the array substrate;

a black matrix configured to separate the plurality of sub-pixels of the color filter substrate;

a plurality of divided common electrodes and a plurality of data lines on the array substrate, each divided common electrode overlapping two or more of the plurality of sub-pixels, with an opening portion therebetween; and a color wash-out reducing layer on the array substrate and configured to reduce color wash-out phenomenon of the sub-pixels which are separated by the black matrix wherein a width of the black matrix is larger than a width of the opening portion, wherein a width of the opening portion is larger than a width of each of the plurality of data lines, and wherein the color wash-out reducing layer is configured to be overlapped at the opening portion, with a width of the color wash-out reducing layer being larger than the width of the opening portion, wherein a reflectance of visible wavelengths of a bottommost metallic layer of the color wash-out reducing layer is higher than a reflectance of visible wavelengths of an uppermost metallic layer of the color wash-out reducing layer, and wherein a thickness of the uppermost metallic layer of the color wash-out reducing layer is more than 250 Å to increase the absorption efficiency of the visible wavelengths.

12. The liquid crystal display apparatus of claim 11, wherein the color wash-out reducing layer is configured to control the plurality of divided common electrodes.

13. The liquid crystal display apparatus of claim 12, wherein the color wash-out reducing layer and the divided common electrodes are separated by an inorganic planarization layer having a thickness of at least 0.8 μm resulting in reduced parasitic capacitance when compared to a conventional liquid crystal display apparatus with said color wash-out reducing layer.

14. A liquid crystal display apparatus having a plurality of sub-pixels to display an image, comprising:

a plurality of common electrode lines, a plurality of data lines, a plurality of divided common electrodes and a data driver on a first substrate, the plurality of common electrode lines dividing the plurality of sub-pixels into a plurality of groups of sub-pixels, each divided common electrode overlapping one of the plurality of groups of sub-pixels;

wherein the divided common electrodes are spaced apart from each other, thereby forming an opening portion therebetween, wherein the plurality of data lines are disposed on the plurality of common electrode lines and the plurality of divided common electrodes are disposed on the plurality of data lines, wherein the common electrode line and the data line are in the opening portion and are overlapped with each other, wherein the width of the plurality of common electrode lines is larger than the width of the opening portion, and wherein a width of the common electrode line is larger than a width of the data line, wherein a reflectance of visible wavelengths of a bottommost metallic layer of the common electrode lines is higher than a reflectance of visible wavelengths of an uppermost metallic layer of the common electrode lines, and wherein a thickness of the uppermost metallic layer of the common electrode lines is more than 250 Å to increase the absorption efficiency of the visible wavelengths.

15. The liquid crystal display apparatus of claim 14, wherein an arrangement of the plurality of the common electrode lines, the plurality of divided common electrodes and the data driver is configured to provide at least one among self-capacitance sensing function, power saving function, and over driving function.

* * * * *